(12) United States Patent
Kawamura et al.

(10) Patent No.: US 10,497,020 B2
(45) Date of Patent: Dec. 3, 2019

(54) INFORMATION PROCESSING DEVICE, COMMUNICATION SYSTEM, AND INFORMATION PROCESSING METHOD

(71) Applicant: SONY CORPORATION, Tokyo (JP)

(72) Inventors: Toshiyuki Kawamura, Tokyo (JP); Manabu Kii, Tokyo (JP); Yoshiki Takeoka, Tokyo (JP); Akari Hoshi, Tokyo (JP); Yasuhide Hosoda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 538 days.

(21) Appl. No.: 14/899,117

(22) PCT Filed: May 27, 2014

(86) PCT No.: PCT/JP2014/002800
§ 371 (c)(1),
(2) Date: Dec. 16, 2015

(87) PCT Pub. No.: WO2014/203463
PCT Pub. Date: Dec. 24, 2014

(65) Prior Publication Data
US 2016/0140603 A1    May 19, 2016

(30) Foreign Application Priority Data

Jun. 21, 2013 (JP) .................................. 2013-130573

(51) Int. Cl.
*G06Q 30/02* (2012.01)
*G06Q 90/00* (2006.01)

(52) U.S. Cl.
CPC ..... *G06Q 30/0245* (2013.01); *G06Q 30/0242* (2013.01); *G06Q 90/00* (2013.01)

(58) Field of Classification Search
CPC .......... G06Q 30/0214; G06Q 30/0241; G06Q 30/0242; G06Q 30/0207; G06Q 30/0245; G06Q 90/00
See application file for complete search history.

(56) References Cited

U.S. PATENT DOCUMENTS

| | | | | |
|---|---|---|---|---|
| 6,119,101 A | * | 9/2000 | Peckover | G06Q 30/02 705/14.17 |
| 9,251,395 B1 | * | 2/2016 | Botchen | G06K 9/00 |
| 2002/0035560 A1 | * | 3/2002 | Sone | G06Q 30/06 |
| 2003/0163371 A1 | * | 8/2003 | Beard | G06Q 30/02 705/14.49 |

(Continued)

OTHER PUBLICATIONS

Kathleen Debevec, Jerome B. Kernan, More Evidence on the Effects of a Presenter's Physical Attractiveness, Some Cognitive, Affective, and Behavioral Consequences, Jan. 1, 1984, Advances in Consumer Research, pp. 127-132 (Year: 1984).*

*Primary Examiner* — Luis A Brown
*Assistant Examiner* — Robert C Johnson
(74) *Attorney, Agent, or Firm* — Xsensus LLP

(57) ABSTRACT

An information processing system that acquires feedback information from a first user having viewed an advertising activity of a second user, the advertising activity including displaying advertising information on an information processing apparatus possessed by the second user; and updates profile information for determining an effectiveness of the advertising activity based on the received feedback information.

20 Claims, 25 Drawing Sheets

(56) References Cited

U.S. PATENT DOCUMENTS

| | | | | |
|---|---|---|---|---|
| 2005/0251553 A1* | 11/2005 | Gottfried | ........... | G06Q 30/0277 |
| | | | | 709/204 |
| 2007/0043616 A1* | 2/2007 | Kutaragi | ................ | G06Q 30/02 |
| | | | | 705/14.68 |
| 2011/0178863 A1* | 7/2011 | Daigle | ............... | G06Q 30/0231 |
| | | | | 705/14.31 |
| 2011/0280437 A1* | 11/2011 | Rodriguez | .............. | G06F 3/011 |
| | | | | 382/100 |
| 2012/0265606 A1* | 10/2012 | Patnode | ............ | G06Q 30/0242 |
| | | | | 705/14.41 |
| 2014/0244566 A1* | 8/2014 | Hewett | ............. | G06Q 30/0242 |
| | | | | 706/52 |
| 2016/0140603 A1* | 5/2016 | Kawamura | ........ | G06Q 30/0242 |
| | | | | 705/14.44 |
| 2016/0155146 A1* | 6/2016 | Valentino | ........... | G06Q 30/0255 |
| | | | | 705/14.53 |

* cited by examiner

FIG. 4

| PERSONAL IDENTIFICATION INFORMATION | PERSONAL ATTRIBUTE INFORMATION | | | BEHAVIOR INFORMATION | | | APPEARANCE INFORMATION | | | | | GRADING INFORMATION |
|---|---|---|---|---|---|---|---|---|---|---|---|---|
| 111 | 112 | | | 113 | | | 114 | | | | | 115 |
| | GENDER | AGE | OCCUPATION | ACTIVITY AREA | ACTIVITY CONTENT | TRANSPORTATION | HAIR STYLE | FASHION | BODY TYPE | SIMILAR CELEBRITY | FEATURE | |
| P0001 | MALE | 35 | OFFICE WORKER | YOKOHAMA SHONAN | RUNNING | TOKAIDO SOUTH MAIN LINE | BALD | FORMAL | SLIM | Yagi TADANO | ROBUST | 2242 |
| P0002 | FEMALE | 21 | UNDERGRADUATE | SHINAGAWA | STREET DANCE | TOKAIDO LINE | BROWN HAIR | CASUAL | STANDARD | SHIGGE | BIG EYES | ... |
| P0003 | MALE | 20 | UNDERGRADUATE | IKEBUKURO | SHOPPING | SANYO LINE | BLACK HAIR | ... | STANDARD | Ken KEMURI | HANDSOME | ... |
| P0004 | FEMALE | 24 | OFFICE WORKER | SHINJUKU | NAIL ART | ODAKYU | GOLDEN HAIR | CASUAL | STANDARD | Shibasaki RU | BLACK HAIR | ... |
| P0005 | FEMALE | 27 | OFFICE WORKER | SHINJUKU | MUSIC | KEIO LINE | RED HAIR | ... | SLIM | Ueluna CURRY | PRETTY HANDS | ... |
| P0006 | FEMALE | 36 | OFFICE WORKER | CHIBA | RUNNING | SOBU LINE | BLACK HAIR | CASUAL | SLIM | Ueluna GOHARA | SLIM LEGS | ... |
| P0007 | MALE | 42 | OFFICE WORKER | TSUKUBA | RUNNING | SEIBU SHINJUKU LINE | BLACK HAIR | FORMAL | SLIM | Tano RANKEN | IN SPECTACLES | ... |
| ... | ... | ... | ... | ... | ... | ... | ... | ... | ... | ... | ... | ... |

| PERSONAL IDENTIFICATION INFORMATION 121 | ADVERTISEMENT IDENTIFICATION INFORMATION 122 | EFFECT MEASUREMENT INFORMATION 123 | | | | EVALUATION INFORMATION 124 | | GRADING INFORMATION 125 |
|---|---|---|---|---|---|---|---|---|
| | | NUMBER OF VISUAL LINES | MOVEMENT DISTANCE | ACTIVITY PLACE | ACTIVITY TIME | YOU WORKS HARD | I HAVE OBTAINED DESIRABLE COUPON | |
| P001 | KO001 | 34 | 100 m | WEST EXIT IN SHIBUYA STATION | THREE HOURS | 14 | 12 | |
| P002 | KO002 | ... | ... | ... | ... | ... | ... | 2342 |
| ... | ... | ... | ... | ... | ... | ... | ... | ... |
| ... | ... | ... | ... | ... | ... | ... | ... | ... |

| ADVERTISEMENT IDENTIFICATION INFORMATION 131 | IMAGE INFORMATION 132 | SOUND INFORMATION 133 | PROFILE INFORMATION 134 | ADDITIONAL INFORMATION 135 |
|---|---|---|---|---|
| K0001 | 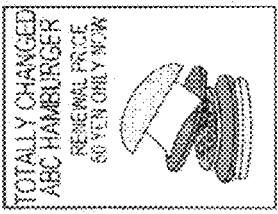 TOTALLY CHANGED ABC HAMBURGER RENEWAL PRICE 50 YEN ONLY NOW | TOTALLY CHANGED ABC HAMBURGER! RENEWAL PRICE 50 YEN ONLY NOW | MALE AND FEMALE CHILDREN | ADVERTISEMENT COST: ONE HUNDRED THOUSAND TO TWO HUNDRED THOUSAND ADVERTISEMENT AREA: AROUND SHINJUKU, SHIBUYA AND IKEBUKURO ADVERTISEMENT TIME ZONE: TODAY 8:00 TO 17:00 |
| K0002 | | | MALE AND FEMALE IN TWENTIES | COUPON INFORMATION |
| ... | ... | ... | ... | ... |

PLEASE SELECT DESIRED PERSON
(PERSON SERVING AS ADVERTISEMENT MEDIUM)
AND PRESS ENTER BUTTON

SELECT BEHAVIOR INFORMATION

| ACTIVITY AREA | SHINJUKU | ▽ | ~501 |
| ACTIVITY CONTENT | STREET DANCE | ▽ | ~502 |

SELECT APPEARANCE INFORMATION

| FIRST APPEARANCE INFORMATION | HANDSOME | ▽ | ~503 |
| SECOND APPEARANCE INFORMATION | IN-SPECTACLES | ▽ | ~504 |
| THIRD APPEARANCE INFORMATION | SILKY HAIR | ▽ | ~505 |
| FOURTH APPEARANCE INFORMATION | .... | ▽ | ~506 |

507  508
ENTER  RETURN

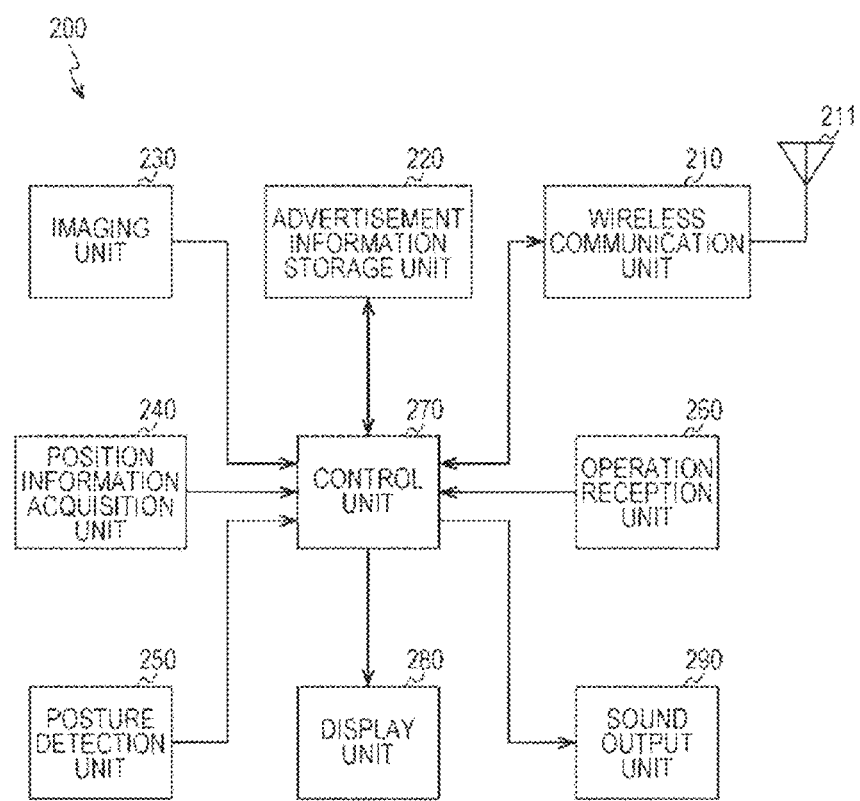

FIG. 9

| 221 ADVERTISEMENT IDENTIFICATION INFORMATION | 222 IMAGE INFORMATION | 223 SOUND INFORMATION | 224 PROFILE INFORMATION | 225 ADDITIONAL INFORMATION | 226 EFFECT MEASUREMENT INFORMATION | | | |
|---|---|---|---|---|---|---|---|---|
| | | | | | NUMBER OF VISUAL LINES | MOVEMENT DISTANCE | ACTIVITY PLACE | ACTIVITY TIME |
| KC001 | TOTALLY CHANGED ABC HAMBURGER | TOTALLY CHANGED ABC HAMBURGER! RENEWAL PRICE 50 YEN ONLY NOW | MALE AND FEMALE CHILDREN | ADVERTISEMENT AREA AROUND SHINJUKU, SHIBUYA AND IKEBUKURO | 34 | 100 m | WEST EXIT IN SHIBUYA STATION | THREE HOURS |
| | | | MALE AND FEMALE IN TWENTIES | ADVERTISEMENT TIME ZONE TODAY 8:00 TO 17:00 | | | | |
| | | | | COUPON INFORMATION | | | | |
| KC002 | ... | ... | ... | ... | ... | ... | ... | ... |
| ... | ... | ... | ... | ... | ... | ... | ... | ... |

220

FIG. 19
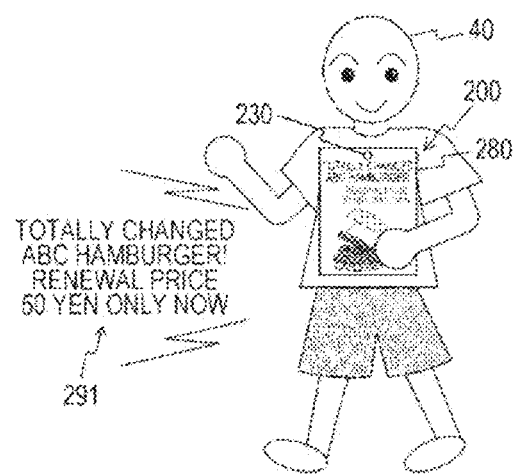
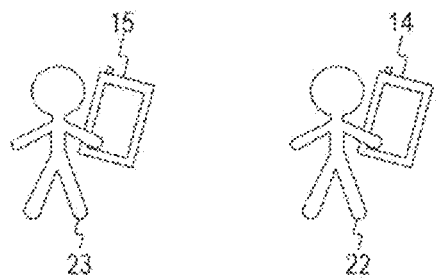

INFORMATION PROCESSING DEVICE, COMMUNICATION SYSTEM, AND INFORMATION PROCESSING METHOD

TECHNICAL FIELD

The present technology relates to an information processing device. Specifically, the present technology relates to an information processing device, a communication system, and an information processing method, of treating advertisement information.

BACKGROUND ART

In the related art, advertising is performed using various advertisement media. For example, an advertisement delivery system in which an advertisement delivered from an advertisement delivery station is displayed on a display device has been proposed (for example, refer to PTL 1).

CITATION LIST

Patent Literature

PTL 1: JP 2002-269290A

SUMMARY

Technical Problem

In the above-described related art, the advertisement delivered from the advertisement delivery station is delivered to display devices via a communication network, and thus the advertisement can be displayed on a plurality of display devices.

Here, there is an advertisement method in which advertising is performed using a person as an advertisement medium, as, for example, in an advertisement by a sandwich man who wears advertisement boards on the front and rear sides of his or her body. As above, in a case where advertising is performed using a person as an advertisement medium, it is expected that an advertisement effect may be different depending on a relationship between the advertisement and the person serving as an advertisement medium. Therefore, it is important to enhance an advertisement effect in consideration of such a relationship.

It is desirable to enhance an advertisement effect.

Solution to Problem

According to one exemplary embodiment, the disclosure is directed to an information processing system that acquires feedback information from a first user having viewed an advertising activity of a second user, the advertising activity including displaying advertising information on an information processing apparatus possessed by the second user; and updates profile information for determining an effectiveness of the advertising activity based on the received feedback information.

The profile information may include at least one of identification information corresponding to at least one of the second user and the information processing apparatus; personal attribute information corresponding to the second user, the personal attribute information indicating at least one of a gender, age and occupation of the second user; behavior information corresponding to the advertising activity, the behavior information indicating at least one of an location and an activity corresponding to the second user while performing the advertising activity; appearance information corresponding to the second user, the appearance information indicating at least one of a hair style, a fashion style, a celebrity resemblance and body type corresponding to the second user; and grading information as the profile information for determining the effectiveness of the advertising activity.

The information processing system may also store advertising activity information of each of a plurality of advertising activities including the advertising activity of the second user. The advertising activity information may include at least one of personal identification information corresponding to a user that performs the advertising activity; advertisement identification information corresponding to the advertising activity; effect measurement information indicating at least one of a visual effect, movement distance, location and duration corresponding to the advertising activity; evaluation information received from a user viewing the advertising activity; and grading information indicating an effectiveness of the advertising activity.

The information processing system may generate the profile information for determining the effectiveness of the advertising activity based on effect measurement information and the feedback information acquired from the second user.

The effect measurement information may include information indicating at least one of a visual effect, movement distance, location and duration corresponding to the advertising activity. The feedback information acquired from the first user may include at least one of information evaluating the advertising information displayed by the information processing apparatus and information evaluating the second user.

The stored profile information may include profile information corresponding to a plurality of users including the second user, and the profile information includes grading information indicating an effectiveness of an advertising activity performed by each of the plurality of users.

The information processing system may rank the plurality of users based on the grading information, and determine a reward to be given to at least one of the plurality of users based on the grading information.

The information processing system may select a user from the plurality of users to perform an advertising activity based on the grading information indicating the effectiveness of the advertising activity performed by each of the plurality of users.

According to another exemplary embodiment, the disclosure is directed to a method performed by an information processing system, the method including: acquiring, by circuitry of the information processing system, feedback information from a first user having viewed an advertising activity of a second user, the advertising activity including displaying advertising information on an information processing apparatus possessed by the second user; and updating, by the circuitry, profile information for determining an effectiveness of the advertising activity based on the received feedback information.

According to another exemplary embodiment, the disclosure is directed to a non-transitory computer-readable medium including computer program instructions, which when executed by an information processing system, cause the system to: acquire feedback information from a first user having viewed an advertising activity of a second user, the advertising activity including displaying advertising information on an information processing apparatus possessed by the second user; and update profile information for determining an effectiveness of the advertising activity based on the received feedback information.

Advantageous Effects of Invention

According to the present technology, it is possible to achieve an excellent effect that an advertisement effect can be enhanced.

BRIEF DESCRIPTION OF DRAWINGS

FIG. 4 is a diagram schematically illustrating an example of storage content of a profile information storage unit according to the first embodiment of the present technology.

FIG. 5 is a diagram schematically illustrating an example of storage content of an advertising activity information storage unit according to the first embodiment of the present technology.

FIG. 6 is a diagram schematically illustrating an example of storage content of an advertisement information storage unit according to the first embodiment of the present technology.

FIG. 7 is a diagram illustrating an example (advertisement medium selection screen) of an advertisement medium selection screen displayed on a display unit according to the first embodiment of the present technology.

FIG. 8 is a block diagram illustrating a functional configuration example of the information processing device according to the first embodiment of the present technology.

FIG. 9 is a diagram schematically illustrating an example of storage content of an advertisement information storage unit according to the first embodiment of the present technology.

FIG. 10 is a diagram illustrating an example (advertisement selection screen) of an advertisement selection screen displayed on the display unit according to the first embodiment of the present technology.

FIG. 19 is a diagram illustrating an example of a case where a person who has an information processing device and serves as an advertisement medium gives a performance according to a second embodiment of the present technology.

DESCRIPTION OF EMBODIMENTS

Hereinafter, embodiments of the present technology will be described. The description will be made in the following order.

1. First Embodiment (an example in which an advertising activity is conducted using a person as an advertisement medium)

2. Second Embodiment (an example in which an incentive is given to an advertising activity which is estimated to be large in an advertisement effect)

3. Modification Examples

1. First Embodiment

Configuration Example of Communication System

Figure 1:
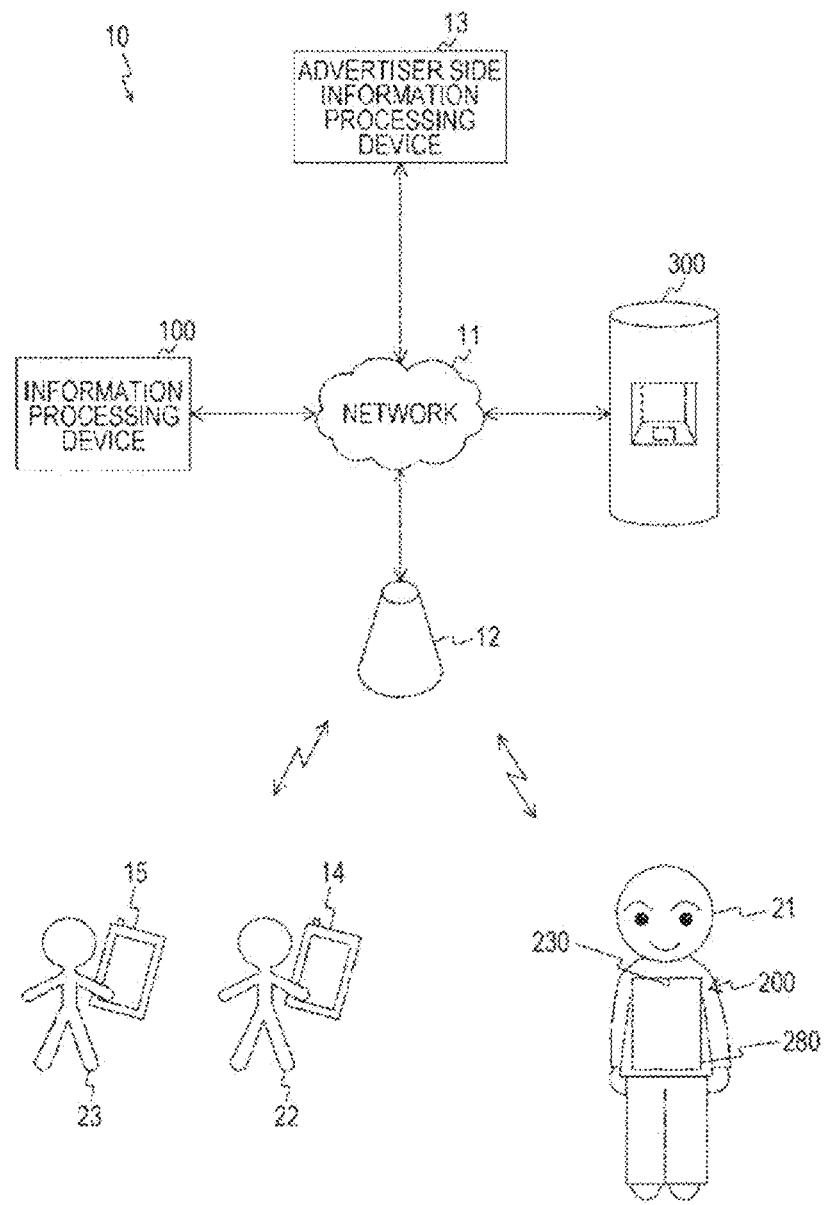
FIG. 1 is a diagram illustrating a configuration example of a communication system according to a first embodiment of the present technology.

FIG. 1 is a diagram illustrating a configuration example of a communication system 10 according to the first embodiment of the present technology.

The communication system 10 includes a network 11, a base station 12, an advertiser side information processing device 13, an information processing device 14, an information processing device 15, an information processing device 100, an information processing device 200, and an advertisement information providing device 300.

The network 11 is a public line network such as a telephone network or the Internet.

The base station 12 is a base station which connects the network 11 to the respective information processing devices 14 and 15 and the information processing device 200, by using wireless communication. As the wireless communication, a communication function such as, for example, 3rd generation (3G), long term evolution (LTE). LTE-Advanced (LTE-A), or Wi-Fi (registered trademark) (Wireless Fidelity) may be used.

The advertiser side information processing device 13 is an information processing device which is used by a requester (for example, a company and a sole proprietor) who requests an advertisement. For example, the advertiser side information processing device 13 transmits advertisement request information for requesting an advertisement to the information processing device 100 via the network 11 on the basis of an operation input by the requester. In addition, the advertiser side information processing device 13 is implemented by, for example, a personal computer.

The information processing device 14 is an information processing device which is used by a person 22. In addition, the information processing device 15 is an information processing device which is used by a person 23. The information processing devices 14 and 15 are implemented by, for example, a mobile phone, a smart phone, a tablet terminal, or a dedicated terminal.

The information processing device 100 manages a person 21 serving as an advertisement medium and also manages advertisement information output from an information processing device 200 of the person 21. For example, the information processing device 100 performs a process for outputting, from the information processing device 200, advertisement information (for example, a display screen of a display unit 280 and sound information 291 illustrated in FIG. 2) corresponding to advertisement request information transmitted from the advertiser side information processing device 13. In addition, the information processing device 100 acquires, from the information processing device 200, effect measurement information (for example, effect measurement information 226 illustrated in FIG. 9) regarding advertisement information which is currently output from the information processing device 200. Further, the information processing device 100 acquires evaluation information regarding the advertisement information from the information processing devices 14 and 15 of persons (persons 22 and 23 looking at the advertisement) who acquire the advertisement information output from the information processing device 200. Furthermore, the information processing device 100 generates effect report information corresponding to the advertisement request information transmitted from the advertiser side information processing device 13 on the basis of the effect measurement information acquired from the information processing device 200 and the evaluation information acquired from the information processing devices 14 and 15. Moreover, the information processing device 100 transmits the generated effect report information to the advertiser side information processing device 13. In addition, the information processing device 100 transmits payment information for making a payment to the person 21 serving as an advertisement medium, to the information processing device 200, by referring to payment information which is transmitted from the advertiser side information processing device 13 in response to the effect report information.

Figure 2:
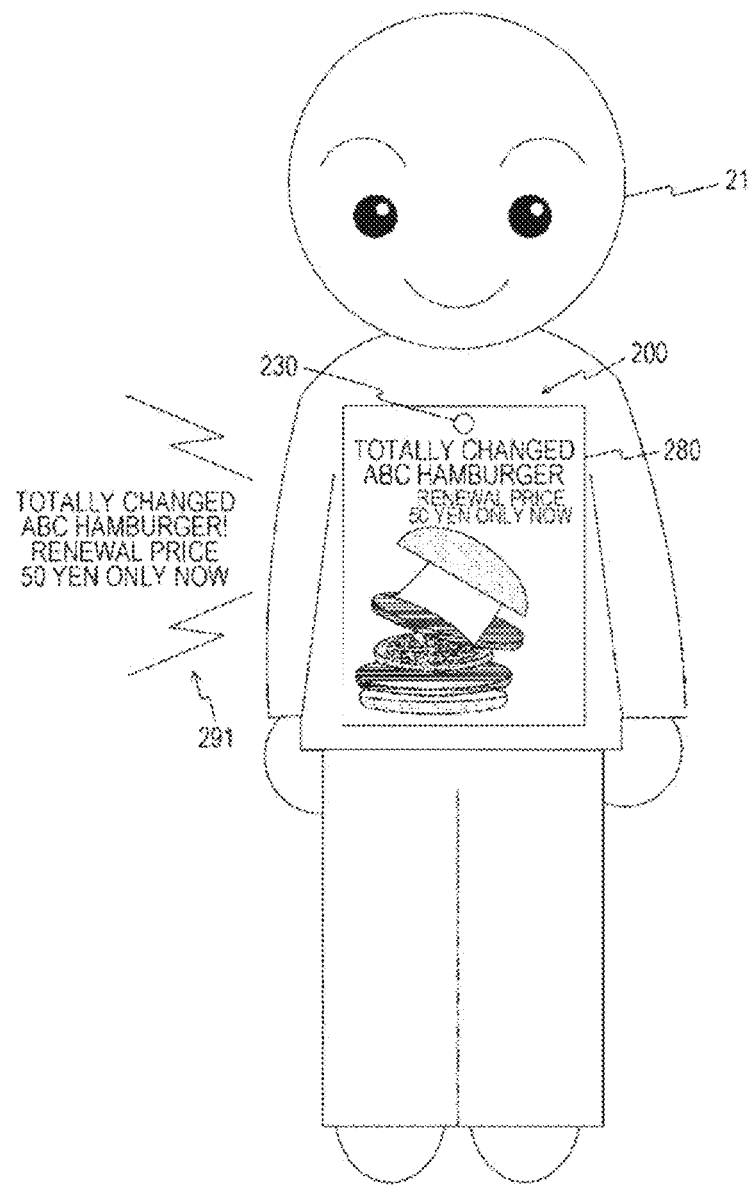
FIG. 2 is a diagram illustrating an output example of advertisement information which is output from a display unit and a sound output unit of an information processing device according to the first embodiment of the present technology.

The information processing device 200 is an information processing device (for example, a wearable next-generation mobile device) of the advertisement medium side which is used by the person 21 serving as an advertisement medium. In the first embodiment of the present technology, the information processing device 200 is indicated by a flat electronic device which is attached to the entire clothes worn by the person 21. In addition, the information processing device 200 includes an imaging unit 230 and a display unit 280. The imaging unit 230 and the display unit 280 will be described in detail with reference to FIG. 8. Further, a display example of image information on the display unit 280 is illustrated in FIG. 2. Furthermore, the information processing device 200 is an example of an output device.

Figure 11:
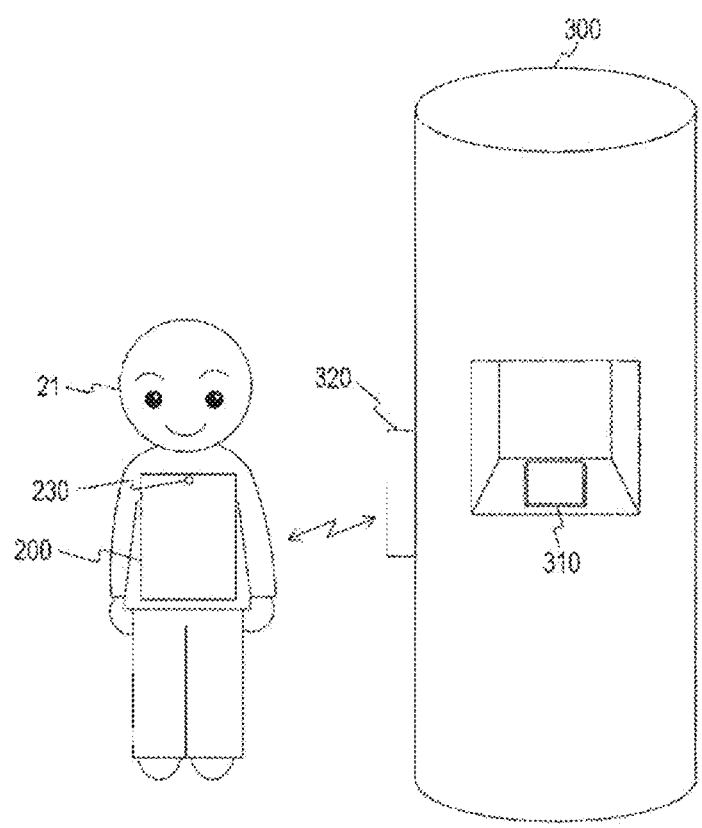
FIG. 11 is a diagram illustrating an acquisition example in a case where the information processing device acquires advertisement information from an advertisement information providing device according to the first embodiment of the present technology.

The advertisement information providing device 300 is a device which stores advertisement information transmitted from the information processing device 100, and transmits the stored advertisement information to another information processing device (for example, the information processing device 200) by using short-range wireless communication (noncontact wireless communication). The advertisement information providing device 300 is an information processing device which is installed, for example, on the street or in a sightseeing spot. In addition, a use example of the advertisement information providing device 300 is illustrated in FIG. 11.

Further, FIG. 1 illustrates only a single device as one of the devices connected to the network 11, but the first embodiment of the present technology is also applicable to a case where the number of each device is two or more.

"Display Example of Advertisement Information"

FIG. 2 is a diagram illustrating an output example of advertisement information which is output from the display unit 280 and a sound output unit 290 (illustrated in FIG. 8) of the information processing device 200 according to the first embodiment of the present technology.

As illustrated in FIG. 2, the imaging unit 230 and the display unit 280 are provided on one surface of the information processing device 200. In addition, image information corresponding to advertisement information transmitted from the information processing device 100 is displayed on the display unit 280, and sound information 291 corresponding to the advertisement information is output from the sound output unit 290. Here, a material of the advertisement which is a display target on the display unit 280 may be a still image such as an advertising catalog or a pamphlet, or a moving image. Further, the information processing device 200 is implemented by, for example, a flexible organic EL display.

"Configuration Example of Information Processing Device"

Figure 3:
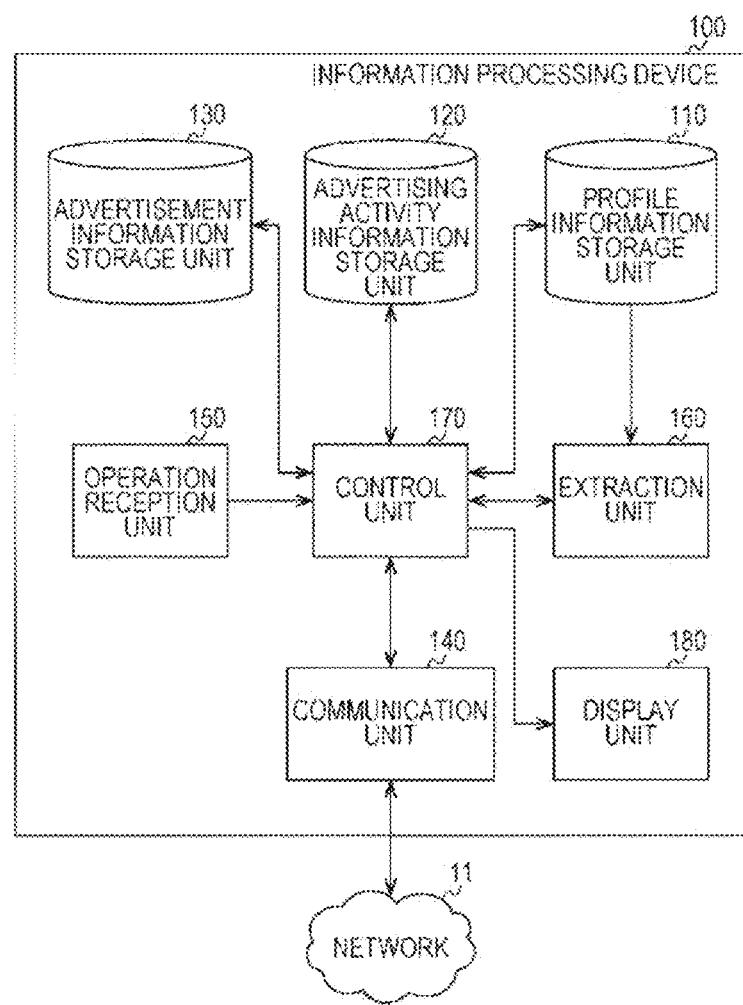
FIG. 3 is a block diagram illustrating a functional configuration example of an information processing device according to the first embodiment of the present technology.

FIG. 3 is a block diagram illustrating a functional configuration example of the information processing device 100 according to the first embodiment of the present technology.

The information processing device 100 includes a profile information storage unit 110, an advertising activity information storage unit 120, an advertisement information storage unit 130, a communication unit 140, an operation reception unit 150, an extraction unit 160, a control unit 170, and a display unit 180.

The profile information storage unit 110 stores profile information regarding a person who is registered as an advertisement medium, and supplies the stored profile information to the control unit 170. In addition, storage content of the profile information storage unit 110 will be described in detail with reference to FIG. 4.

The advertising activity information storage unit 120 stores information (advertising activity information) regarding an advertising activity which is conducted by the person registered as an advertisement medium, and supplies the stored advertising activity information to the control unit 170. In addition, storage content of the advertising activity information storage unit 120 will be described in detail with reference to FIG. 5.

The advertisement information storage unit 130 stores advertisement information which is output from an information processing device of the person registered as an advertisement medium, and supplies the stored advertisement information to the control unit 170. In addition, storage content of the advertisement information storage unit 130 will be described in detail with reference to FIG. 6.

The communication unit 140 is connected to the network 11, and performs communication of various information pieces with other devices under the control of the control unit 170. The communication unit 140 is connected to the advertiser side information processing device 13, for example, via the network 11. In addition, the communication unit 140 is connected to the information processing devices 14, 15 and 200, for example, via the network 11 and the base station 12. Further, the communication unit 140 performs communication of various information pieces with the advertiser side information processing device 13 or the information processing devices 14, 15 and 200. For example, when information transmitted from the advertiser side information processing device 13 or the information processing devices 14, 15 and 200 is received via the network 11, the communication unit 140 supplies the information to the control unit 170. Furthermore, for example, the communication unit 140 transmits information output from the control unit 170, to other devices via the network 11.

The operation reception unit 150 receives an operation input performed by a user, and outputs operation information corresponding to the received operation input to the control unit 170. The operation reception unit 150 is implemented by, for example, a touch panel, a keyboard (or a virtual keyboard on the touch panel), or a mouse.

The extraction unit 160 extracts a transmission destination (a person registered as an advertisement medium) of advertisement information corresponding to advertisement request information which is transmitted from an advertiser, and outputs an extraction result to the control unit 170, under the control of the control unit 170. Specifically, on the basis of an output condition regarding advertisement information which is an output target and profile information of the profile information storage unit 110, the extraction unit 160 extracts a person who satisfies the output condition. Here, the output condition regarding the advertisement information is, for example, an appearance of a person serving as an advertisement medium, an advertisement place, and an advertisement period. In addition, an extraction example will be described in detail with reference to FIGS. 4 and 14.

The control unit 170 controls the respective units of the information processing device 100 on the basis of a control program. The control unit 170 is implemented by, for example, a CPU.

For example, the control unit 170 performs control for outputting advertisement information from an output device (for example, the information processing device 200) of a person who is extracted by the extraction unit 160. Specifically, the control unit 170 transmits advertisement selection information for selecting outputting of advertisement information, to the output device. In addition, after transmitting the advertisement selection information, the control unit 170 transmits advertisement information to the output device so as to output the advertisement information from the output device when selection information indicating that outputting of the advertisement information is selected is received from the output device.

Further, for example, the control unit 170 acquires effect measurement information based on a measurement result of an effect regarding the outputting of the advertisement information from the output device, from the output device. Furthermore, the control unit 170 acquires evaluation information indicating an evaluation regarding the outputting of the advertisement information, performed by a person who looks at the advertisement information output from the output device, from other information processing devices. Moreover, the control unit 170 generates grading information regarding the person extracted by the extraction unit 160 on the basis of the effect measurement information and the evaluation information. In addition, the control unit 170 determines a reward which is given to the person (the person extracted by the extraction unit 160) for the outputting of the advertisement information from the output device on the basis of the generated grading information.

Further, for example, in a case where an acquisition request of related information (for example, coupon information) regarding the advertisement information is received from another information processing device during the outputting of the advertisement information from the output device, the control unit 170 transmits the related information to another information processing device.

In addition, for example, the control unit 170 stores advertisement information in the advertisement information providing device 300 which sends and receives information to and from other devices by using short-range wireless communication. Further, the control unit 170 may cause the advertisement information providing device 300 to output advertisement information to an output device (for example, the information processing device 200), thereby outputting the advertisement information from the output device.

The display unit 180 displays various information pieces under the control of the control unit 170. For example, a profile information registration screen which is used when profile information is stored in the profile information storage unit 110 is displayed on the display unit 180. In addition, a display panel such as, for example, an organic electroluminescence (EL) panel or a liquid crystal display (LCD) panel may be used as the display unit 180.

"Storage Content Example of Profile Information Storage Unit"

FIG. 4 is a diagram schematically illustrating an example of storage content of the profile information storage unit 110 according to the first embodiment of the present technology.

The profile information storage unit 110 is a storage unit which stores and manages information (profile information) regarding a person serving as an advertisement medium every person. Specifically, the profile information storage unit 110 stores personal identification information 111, personal attribute information 112, behavior information 113, appearance information 114, and grading information 115 in correlation with each person. In addition, the profile information storage unit 110 is an example of a profile information management unit.

The personal identification information 111 is identification information for identifying a person serving as an advertisement medium. For example, identification information (for example, a terminal ID) given to an information processing device of a person serving as an advertisement medium is stored in the personal identification information 111. In addition, the information processing device 100 may transmit each information piece to an information processing device of a person serving as an advertisement medium on the basis of the personal identification information stored in the personal identification information 111.

The personal attribute information 112 is information regarding an attribute of a person serving as an advertisement medium. For example, a gender, an age, an occupation, and the like are stored in the personal attribute information 112 as personal attribute information. In addition, information which is input through an operation input performed by a person serving as an advertisement medium may be stored in the personal attribute information 112 without change.

The behavior information 113 is information regarding a behavior of a person serving as an advertisement medium. For example, an activity area, activity content, transportation, and the like are stored in the behavior information 113 as behavior information. Here, the activity area is, for example, an area where a person serving as an advertisement medium mainly acts. In addition, the activity content is, for example, content of activities which are mainly conducted by a person serving as an advertisement medium. Further, the transportation is, for example, a transportation (for example, a train, a bus, or a road name) which is mainly used by a person serving as an advertisement medium. Furthermore, information which is input due to an operation input performed by a person serving as an advertisement medium may be stored in the behavior information 113 without change. Moreover, the behavior information 113 may be appropriately modified on the basis of effect measurement information acquired due to an advertising activity by a person serving as an advertisement medium.

The appearance information 114 is information regarding an appearance of a person serving as an advertisement medium. For example, a hair style, a fashion, a body type, a similar celebrity, a feature, and the like are stored in the appearance information 114 as appearance information. Here, as for the appearance information, it is important to store not subjective information but objective information of a person serving as an advertisement medium in order to appropriately extract a person serving as an advertisement medium in accordance with advertisement information. Therefore, a manager who manages the information processing device 100 preferably stores information in the appearance information 114 by referring to information which is input due to an operation input by a person serving as an advertisement medium.

For example, a person who desires to be registered as an advertisement medium transmits his or her own pictures (for example, a face picture, and a picture of the front and back whole bodies) to the information processing device 100 along with respective information pieces to be stored in the personal attribute information 112 and the behavior information 113. As above, when the respective information pieces (the personal attribute information 112, the behavior information 113, and the person's pictures) are received, the control unit 170 of the information processing device 100 displays a profile information registration screen including the respective information pieces on the display unit 180. In addition, the manager who manages the information processing device 100 may input information to the appearance information 114 by referring to the respective information pieces (for example, the pictures) included in the profile information registration screen.

A transmission process of the respective information pieces (the personal attribute information 112, the behavior information 113, and the person's pictures) may be performed using an information processing device (for example, the information processing device 200) of each person. In addition, the transmission process to the information processing device 100 may be performed using other devices (for example, devices (for example, a device which takes a picture on the spot and seals the picture) installed in a game center, a convenience store, and a sightseeing spot).

The grading information 115 is information indicating grading for an advertising activity by a person serving as an advertisement medium. In addition, the grading information 115 will be described in detail with reference to grading information 125 illustrated in FIG. 5.

As above, the profile information includes the personal attribute information 112 regarding an attribute of a person who is a management target, the behavior information 113 regarding a behavior of the person, and the appearance information 114 regarding the appearance of the person. In addition, the extraction unit 160 extracts information satisfying an output condition from the respective information pieces included in the profile information, and extracts a person corresponding to the extracted information. For example, in a case where a person who resembles "Koji TADANO" is set as an output condition, the extraction unit 160 extracts the person corresponding to "P0001" of the personal identification information 111.

In addition, in this example, the manager who manages the information processing device 100 does not meet a person serving as an advertisement medium and registers profile information thereof. However, for example, the manager who manages the information processing device 100 may collect persons serving as an advertisement medium so as to hold an audition, and register only persons having passed the audition as persons serving as an advertisement medium.

"Storage Content Example of Advertising Activity Information Storage Unit"

FIG. 5 is a diagram schematically illustrating storage content of the advertising activity information storage unit 120 according to the first embodiment of the present technology.

The advertising activity information storage unit 120 is a storage unit which stores information (advertising activity information) regarding an advertising activity of a person serving as an advertisement medium for each advertising activity. Specifically, personal identification information 121, advertisement identification information 122, effect measurement information 123, evaluation information 124, and grading information 125 are stored in the advertising activity information storage unit 120 in correlation with each advertising activity. In addition, the same information as the grading information 115 of the profile information storage unit 110 illustrated in FIG. 4 is stored in the grading information 125.

The personal identification information 121 is identification information for identifying a person serving as an advertisement medium. In addition, the personal identification information 121 corresponds to the personal identification information 111 illustrated in FIG. 4.

The advertisement identification information 122 is identification information for advertisement information. For example, a serial number is given as identification information, for example, in a reception order of advertisement request information received from advertisers.

The effect measurement information 123 is effect measurement information which is acquired due to an advertising activity by a person serving as an advertisement medium. The effect measurement information is transmitted from an information processing device of the person serving as an advertisement medium.

The evaluation information 124 is evaluation information which is acquired due to an advertising activity by a person serving as an advertisement medium. The evaluation information is transmitted from information processing devices of persons other than the person serving as an advertisement medium. In other words, whereas the effect measurement information is transmitted from an information processing device of the person serving as an advertisement medium, the evaluation information is transmitted from information processing devices of other persons.

The grading information 125 is information indicating grading for an advertising activity by a person serving as an advertisement medium. In other words, the grading information 125 is information indicating a rank of the person serving as an advertisement medium. For example, a reward given to the person serving as an advertisement medium is determined in accordance with the rank. For example, higher-ranking persons (the top 10% of persons) may be given rewards which are 1.5 times or twice as large as typical rewards in accordance with the ranks. In addition, for example, lower-ranking persons (the bottom 10% of persons) may be given rewards which are 0.5 times or 0.8 times as much as typical rewards.

The grading information is information which is determined by the manager who manages the information processing device 100 by referring to both the effect measurement information 123 and the evaluation information 124. In addition, the grading information may be obtained, for example, through automatic calculation on the basis of each of the effect measurement information 123 and the evaluation information 124. For example, the information stored in each of the effect measurement information 123 and the evaluation information 124 may be digitalized, and calculation (for example, addition) of the digitalized information may be performed, thereby calculating the grading information.

As described above, the advertising activity information storage unit 120 is an advertising activity management unit which manages the effect measurement information based on a measurement result of an effect regarding outputting of advertisement information from an output device (for example, the information processing device 200). In addition, the advertising activity information storage unit 120 is an advertising activity management unit which manages the evaluation information indicating an evaluation regarding outputting of advertisement information, performed by a person who looks at the advertisement information output from an output device (for example, the information processing device 200). In other words, the advertising activity information storage unit 120 is an example of an advertising activity information management unit.

"Storage Content Example of Advertisement Information Storage Unit"

FIG. 6 is a diagram schematically illustrating an example of storage content of the advertisement information storage unit 130 according to the first embodiment of the present technology.

The advertisement information storage unit 130 is a storage unit which stores information (advertisement information) regarding an advertisement requested by an advertiser for each advertisement. Specifically, advertisement identification information 131, image information 132, sound information 133, profile information 134, and additional information 135 are stored in the advertisement information storage unit 130 in correlation with each advertisement. In addition, each information piece is assumed to be included in advertisement request information transmitted from an advertiser (for example, the advertiser side information processing device 13).

The advertisement identification information 131 is identification information for identifying advertisement information. In addition, the advertisement identification information 131 corresponds to the advertisement identification information 122 illustrated in FIG. 5.

The image information 132 is information (image data) for displaying an advertisement as an image. In addition, for convenience of description, FIG. 6 illustrates only an image which is a display target as the image information 132.

The sound information 133 is information (audio data) for outputting an advertisement as a sound. Further, for convenience of description, FIG. 6 illustrates text of a sound which is an output target as the sound information 133.

The profile information 134 is information regarding a profile of a person which is a target of an advertisement. The profile information is used, for example, when effect measurement information of an advertisement is generated.

The additional information 135 is additional information regarding an advertisement. For example, a cost which is paid for an advertisement, an advertising area, an advertising time zone, coupon information regarding an advertisement, and the like are stored as the additional information.

"Display Example of Advertisement Medium Selection Screen"

FIG. 7 is a diagram illustrating an example (advertisement medium selection screen 500) of an advertisement medium selection screen displayed on the display unit 180 according to the first embodiment of the present technology.

The advertisement medium selection screen 500 is a display screen for extracting a person corresponding to each piece of selected information by selecting, for example, the behavior information and the appearance information. In other words, the advertisement medium selection screen 500 is a display screen used to set an output condition for extracting a person who is requested to output advertisement information among a plurality of persons registered as persons serving as an advertisement medium.

For example, the manager who manages the information processing device 100 performs a selection operation for extracting a person who is requested to output advertisement information on the advertisement medium selection screen 500. For example, the manager performs a selection operation on each necessary item in the behavior information and the appearance information.

In a case where the selection operation is performed as above, the extraction unit 160 extracts a person corresponding to the selection operation among persons whose profile information is stored in the profile information storage unit 110, under the control of the control unit 170. For example, the extraction unit 160 extracts a person who matches each item selected by the selection operation, from the profile information storage unit 110. In other words, the extraction unit 160 extracts a person satisfying an output condition from a plurality of persons on the basis of the output condition regarding advertisement information which is an output target and the profile information of the profile information storage unit 110. In addition, the extraction unit 160 outputs information (for example, personal identification information) regarding the extracted person to the control unit 170.

Further, in this example, the advertisement medium selection screen 500 is displayed on the display unit 180 of the information processing device 100, but may be displayed, for example, on a display unit of the advertiser side information processing device 13. As above, if the advertisement medium selection screen 500 is displayed on the display unit of the advertiser side information processing device 13, an advertiser can directly select a desired person (a person serving as an advertisement medium). Accordingly, for example, a product which is an advertisement target or an advertisement medium of which a service is requested can be selected, and thus it is possible to conduct an advertising activity with higher accuracy.

For example, even in a case where advertising is desired to be intensively performed at a place (for example, a residential area) where the streets are deserted in the daytime, the place is designated using the advertisement medium selection screen 500, and thus advertising can be appropriately performed even at such a place. In addition, for example, a place on which advertising is desired to be concentrated can be set by adjusting parameters of an advertisement medium.

"Configuration Example of Information Processing Device of Advertisement Medium Side"

FIG. 8 is a block diagram illustrating a functional configuration example of the information processing device 200 according to the first embodiment of the present technology.

The information processing device 200 includes a wireless communication unit 210, an antenna 211, an advertisement information storage unit 220, an imaging unit 230, a position information acquisition unit 240, a posture detection unit 250, an operation reception unit 260, a control unit 270, a display unit 280, and a sound output unit 290.

The wireless communication unit 210 performs transmission and reception of each information piece with other information processing devices (for example, the information processing device 100 and the advertisement information providing device 300) by using wireless communication via the antenna 211, under the control of the control unit 270. In addition, in the first embodiment of the present technology, the wireless communication unit 210 can perform wireless communication in a plurality of communication modes.

For example, in one communication mode (first communication mode) among the plurality of communication modes, wireless communication using the base station 12 (illustrated in FIG. 1) is assumed to be performed. For example, 3rd generation (3G), long term evolution (LTE), LTE-Advanced (LTE-A), or Wi-Fi (registered trademark) (Wireless Fidelity) may be used in this wireless communication.

In addition, for example, in another communication mode (second communication mode) among the plurality of communication modes, communication is assumed to be performed with other information processing devices (for example, the advertisement information providing device 300) by using short-range wireless communication (noncontact wireless communication). For example, wireless communication (for example, near field communication (NFC)) whose communication distance is limited to several tens of cm may be used as the short-range wireless communication.

The advertisement information storage unit 220 stores advertisement information (advertisement information which is an output target) transmitted from the information processing device 100, and supplies the stored advertisement information to the control unit 270. In addition, the advertisement information storage unit 220 sequentially stores effect measurement information acquired during outputting of the advertisement information. Further, storage content of the advertisement information storage unit 220 will be described in detail with reference to FIG. 9.

The imaging unit 230 images an object so as to generate an image (image data), and outputs the generated image to the control unit 270. The imaging unit 230 is constituted by, for example, an optical system (a plurality of lenses), an imaging element, and a signal processing portion.

The position information acquisition unit 240 acquires information (position information) for specifying a position where the information processing device 200 is located, and outputs the acquired position information to the control unit 270. The position information includes, for example, latitude, longitude, and an altitude. The position information acquisition unit 240 is implemented by, for example, a GPS receiver which receives a global positioning system (GPS) signal so as to calculate latitude, longitude, and an altitude. In addition, the position information acquisition unit 240 may acquire position information via an external network. For example, the position information acquisition unit 240 may acquire position information from other information processing devices (for example, a communication control device operated by a telecommunications carrier) via the external network. Further, for example, the position information acquisition unit 240 may acquire information (position information) regarding a position corresponding to identification information of an access point of a base station or a wireless LAN operated by a telecommunications carrier. Furthermore, position information may be acquired using acquisition methods other than these acquisition methods.

The posture detection unit 250 detects a change in a posture of the information processing device 100 by detecting acceleration, a motion, a tilt, and the like of the information processing device 100, and outputs posture information regarding the detected change in a posture to the control unit 270. For example, sensors (for example, a gyro sensor, an acceleration sensor, and an angular velocity sensor) which can detect a change in a posture of the information processing device 100 may be used as the posture detection unit 250.

The operation reception unit 260 receives an operation input performed by a user, and outputs operation information corresponding to the received operation input to the control unit 270. The operation reception unit 260 is implemented by, for example, a touch panel, a keyboard (or a virtual keyboard on the touch panel), or a mouse.

The control unit 270 controls the respective units of the information processing device 200 on the basis of a control program. The control unit 270 is implemented by, for example, a CPU.

For example, the control unit 270 measures an effect regarding outputting of advertisement information, and generates effect measurement information on the basis of the measurement result. In this case, the control unit 270 may generate the effect measurement information on the basis of the measurement result and an activity state of a person (a person serving as an advertisement medium) related to the outputting of the advertisement information. Here, for example, the activity state of the person may be set to at least one of a movement distance of the information processing device 200 when outputting the advertisement information, a place of the information processing device 200 when outputting the advertisement information, and an output time of the advertisement information.

In addition, for example, the control unit 270 may detect a visual line of a person looking at advertisement information displayed on the display unit 280 as an effect regarding outputting of the advertisement information, and generate the effect measurement information on the basis of the detection result.

Further, for example, in a case where an acquisition request of related information regarding the advertisement information is received from another information processing device (for example, the information processing device 14 illustrated in FIG. 1) during the display of the advertisement information on the display unit 280, the control unit 270 transmits the related information to another information processing device. Here, the related information is information for displaying an advertisement evaluation screen (for example, an advertisement evaluation screen 520 illustrated in FIG. 13) which is used to perform evaluation of the person regarding the outputting of the advertisement information in other information processing devices. In addition, the related information may be coupon information regarding an advertisement corresponding to the advertisement information.

The display unit 280 displays various images (for example, image information 222 (illustrated in FIG. 9) stored in the advertisement information storage unit 220) under the control of the control unit 270. In addition, for example, a display panel such as an organic EL panel or an LCD panel may be used as the display unit 280.

The sound output unit 290 is, for example, a speaker which outputs various sounds (for example, sound information 223 (illustrated in FIG. 9) stored in the advertisement information storage unit 220) under the control of the control unit 270.

As described above, the display unit 280 and the sound output unit 290 are an output unit which is attached to a person or person's belongings, and correspond to an output unit which outputs advertisement information. In addition, the display unit 280 and the sound output unit 290 are an example of an output unit.

"Storage Content Example of Advertisement Information Storage Unit"

FIG. 9 is a diagram schematically illustrating storage content of the advertisement information storage unit 220 according to the first embodiment of the present technology.

The advertisement information storage unit 220 is a storage unit which stores information (advertisement information) regarding an advertisement which is an output target for each advertisement. Specifically, advertisement identification information 221, image information 222, sound information 223, profile information 224, additional information 225, and effect measurement information 226 are stored in the advertisement information storage unit 220 in correlation with each advertisement.

In addition, the advertisement identification information 221, the image information 222, the sound information 223, the profile information 224, and additional information 225 respectively correspond to the advertisement identification information 131, the image information 132, the sound information 133, the profile information 134, and the additional information 135 illustrated in FIG. 6. In addition, the effect measurement information 226 corresponds to the effect measurement information 123 illustrated in FIG. 5. Therefore, detailed description of each information piece will be omitted.

In addition, the advertisement identification information 221, the image information 222, the sound information 223, the profile information 224, and additional information 225 are information pieces which are transmitted from the information processing device 100 and are stored. Further, the effect measurement information 226 is information which is measured during an advertising activity using the information processing device 200 and is stored.

"Display Example of Advertisement Selection Screen"

FIG. 10 is a diagram illustrating an example (advertisement selection screen 510) of an advertisement selection screen displayed on the display unit 280 according to the first embodiment of the present technology.

The advertisement selection screen 510 is, for example, a display screen which is used for a person serving as an advertisement medium to select advertisement information transmitted from the information processing device 100.

For example, the control unit 170 of the information processing device 100 transmits advertisement information to an information processing device (for example, the information processing device 200) of a person which is extracted by the extraction unit 160. However, it is expected that a person serving as an advertisement medium may not output all pieces of advertisement information transmitted from the information processing device 100, due to a time zone, a preference, or the like. Therefore, the information processing device 100 transmits advertisement selection information for selecting whether or not to output advertisement information, to an information processing device which is extracted as a transmission target of the advertisement information. When the information processing device 200 receives the advertisement selection information, the control unit 270 of the information processing device 200 displays an advertisement selection screen on the display unit 280 on the basis of the received advertisement selection information. For example, the advertisement selection screen 510 is displayed on the display unit 280.

Advertisement information selection icons 511 to 516, an enter button 517, and a return button 518 are displayed on the advertisement selection screen 510.

The advertisement information selection icons 511 to 516 are icons indicating content of advertisement information. For example, an icon including image information corresponding to advertisement information, a reward for an advertising activity, an advertisement time, an advertisement area, and the like is displayed. For example, the person 21 serving as an advertisement medium performs a pressing operation on an advertisement information selection icon corresponding to advertisement information of which an advertising activity is desired to be conducted, and thus can select the desired advertisement information.

The enter button 517 is a button pressed when a selection operation of the advertisement information selection icons 511 to 516 is fixed. In other words, the person 21 serving as an advertisement medium may perform a pressing operation on an advertisement information selection icon corresponding to advertisement information of which an advertising activity is desired to be conducted and performs a pressing operation on the enter button 517, thereby fixing a selection operation thereof.

The return button 518 is a button pressed when returning to a previous screen.

"Acquisition Example of Advertisement Information from Advertisement Information Providing Device"

FIG. 11 is a diagram illustrating an acquisition example in a case where the information processing device 200 acquires advertisement information from the advertisement information providing device 300 according to the first embodiment of the present technology.

The advertisement information providing device 300 includes short-range wireless communication units 310 and 320. In addition, the advertisement information providing device 300 includes a storage unit (not illustrated) which stores advertisement information which is transmitted from the information processing device 100 via the network 11. Further, the advertisement information providing device 300 transmits the stored advertisement information to other information processing devices via the short-range wireless communication units 310 and 320.

Figure 21A:
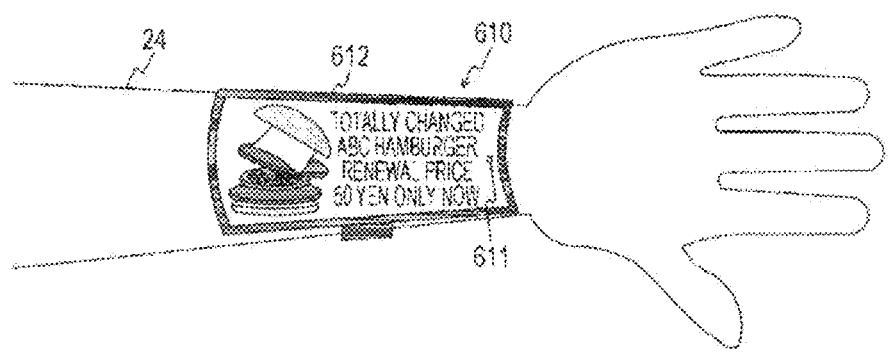
FIG. 21A is a diagram illustrating an attachment example of an information processing device in a modification example of the embodiments of the present technology.
Figure 21B:
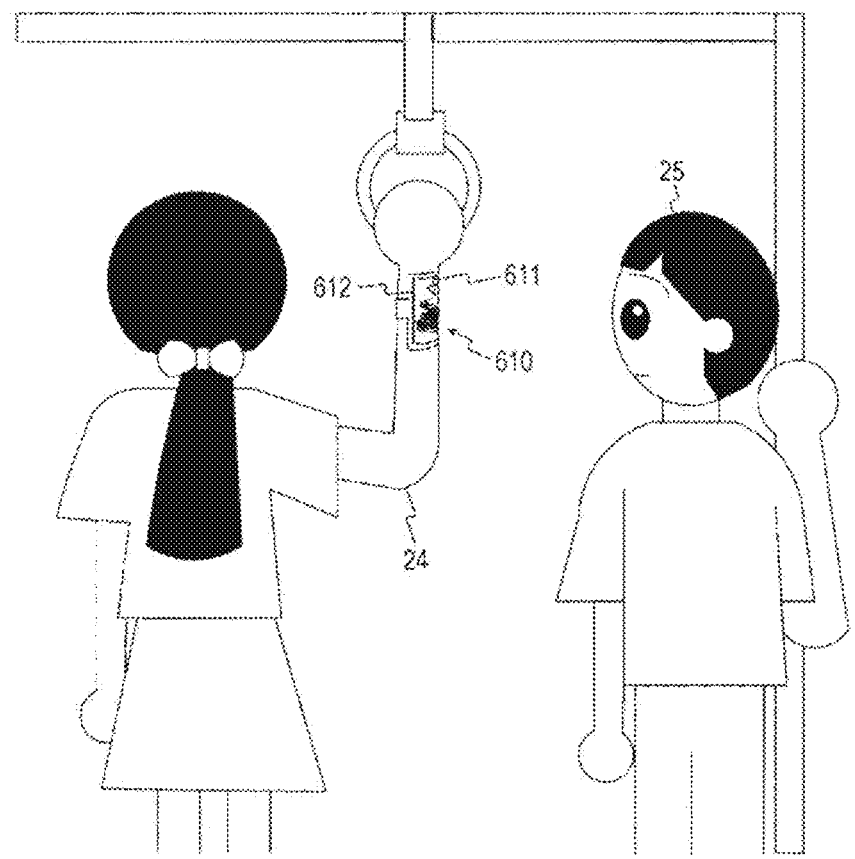
FIG. 21B is a diagram illustrating a use example of an information processing device in a modification example of the embodiments of the present technology.

For example, the advertisement information providing device 300 may transmit advertisement information to a relatively small-sized information processing device (for example, an information processing device 610 illustrated in FIGS. 21A and 21B) via the stamp pad type short-range wireless communication unit 310. In addition, for example, the advertisement information providing device 300 may transmit advertisement information to a relatively large-sized information processing device (for example, the information processing device 200) via the short-range wireless communication unit 320 provided on the surface side thereof. For example, a touch operation in which the information processing device 200 touches the short-range wireless communication unit 320 is performed, and thus the information processing device 200 can acquire advertisement information.

In addition, the advertisement information providing device 300 is provided, for example, on the street or in a sightseeing spot. For example, in a case where the advertisement information providing device 300 is installed in a sightseeing spot, the advertisement information providing device may be installed around a stamp pad (for example, a stamp pad for stamping a commemorative seal of the sightseeing spot when visiting the spot) provided in the sightseeing spot. Further, for example, in a case where the advertisement information providing device 300 is installed on the street, the advertisement information providing device may be installed in a facility around a station, a coffee shop, a convenience store, a vending machine, or the like.

Here, as described above, the information processing device 200 may acquire advertisement information by using wireless communication such as 3G or LTE. In a case where the advertisement information is acquired in this way, if the information processing device 200 is present at a place where the wireless communication can be used, the advertisement information can be acquired. In other words, the information processing device 200 can acquire advertisement information at relatively various places.

However, there is an advertisement which is meaningless unless an advertising activity is conducted at a specific place. For example, in relation to an advertisement whose effect can be expected only in front of the statue of Hachiko, standing in Shibuya Station, it is important to conduct an advertising activity at the place (in front of the statue of Hachiko of Shibuya Station). Therefore, in relation to such advertisement information, advertisement information is not provided using wireless communication such as 3G or LTE, and is provided only using short-range wireless communication (noncontact wireless communication) from the advertisement information providing device 300. Accordingly, a person serving as an advertisement medium is unable to acquire the advertisement information unless the person goes to a place where the advertisement information providing device 300 is installed. For this reason, it is possible to prevent the advertisement information from being supplied to an information processing device which does not go to the place where the advertisement information providing device 300 is installed. Therefore, it is possible to improve reliability of an advertising activity.

In addition, for example, the advertisement information providing device 300 may be installed inside a restaurant, and advertisement information may be transmitted to an information processing device of a person serving as an advertisement medium when the person comes out of the restaurant. In this case, the person serving as an advertisement medium comes out of the restaurant, and can provide advertisement information of the restaurant to people passing each other. In this case, a passing person may be detected, and a voice, "The food at the restaurant was delicious" may be output as advertisement information when passing the detected person. The detection of a passing person may be performed, for example, through a face detection process using an image which is generated by the imaging unit 230.

In addition, for example, a person who searches for restaurants in a predetermined range may be detected, and the voice, "The food at the restaurant was delicious" may be output as advertisement information when passing the detected person. Here, the detection of a person who searches for restaurants may use a detection method using position information. For example, the information processing device 100 acquires position information of an information processing device of the advertisement medium side and position information of an information processing device of the searching side. In addition, the information processing device 100 detects the information processing device of the searching side located in a predetermined range from the information processing device of the advertisement medium side, and transmits the detection result to the information processing device of the advertisement medium side. The information processing device of the advertisement medium side can output a sound of advertisement information on the basis of the detection result.

In addition, in a case where the advertisement information is output after a person serving as an advertisement medium comes out of the restaurant as above, an output range of the advertisement information may be limited to a predetermined range (for example, 1 km) from the restaurant.

"Relationship Example Between Person Serving as Advertisement Medium and Person Looking at Advertisement"

Figure 12:
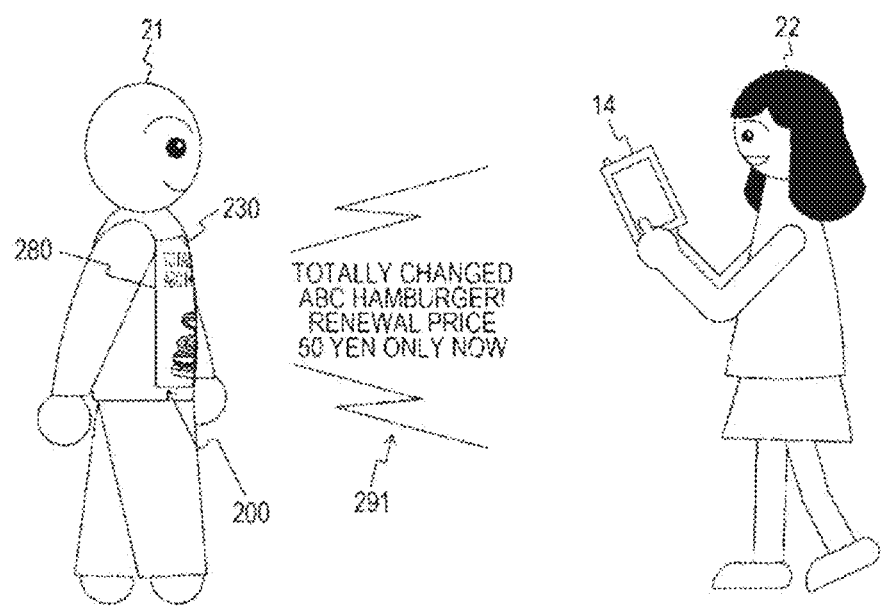
FIG. 12 is a diagram illustrating a relationship example between a person having the information processing device and a person looking at an advertisement displayed on the information processing device according to the first embodiment of the present technology.

FIG. 12 is a diagram illustrating a relationship example between the person 21 having the information processing device 200 and a person 22 looking at an advertisement displayed on the information processing device 200 according to the first embodiment of the present technology.

FIG. 12 illustrates an example in which the person 21 having the information processing device 200 conducts an advertising activity while walking and moving. As illustrated in FIG. 12, when the person 21 having the information processing device 200 walks and moves, the person 22 present in the progressing direction thereof looks at the advertisement information displayed on the display unit 280. In addition, the person 22 present in the progressing direction may hear sound information 291 output from the sound output unit 290.

As above, in a case where the person 22 is interested in the advertisement information output from the information processing device 200, the person 22 may acquire coupon information regarding the advertisement information. For example, the person 22 may acquire the coupon information regarding the advertisement information by performing a predetermined operation using the information processing device 14. This predetermined operation may be, for example, an operation (shaking operation) in which the information processing device 14 is shaken a predetermined number of times or more, an operation (touch operation) in which the information processing device 14 touches the information processing device 200, or an operation in which the advertisement displayed on the information processing device 200 is photographed using the information processing device 14.

"Example of Acquiring Coupon Information Through Shaking Operation"

First, a description will be made of an example of acquiring coupon information through the shaking operation. For example, it is assumed that, when advertisement information is output, the control unit 270 of the information processing device 200 transmits position information which is periodically or aperiodically acquired by the position information acquisition unit 240, to the information processing device 100 via the network 11.

For example, a case is assumed in which the person 22 looking at the advertisement information output from the information processing device 200 performs the shaking operation of the information processing device 14 in the state illustrated in FIG. 12. In this case, a control unit of the information processing device 14 transmits an acquisition request of coupon information and position information acquired by a position information acquisition unit to the information processing device 100 via the network 11. When the acquisition request of coupon information and the position information are received, the control unit 170 of the information processing device 100 compares the received position information with the position information which is transmitted from the information processing device which currently outputs the advertisement information. In addition, the control unit 170 of the information processing device 100 determines which advertisement information is related to the acquisition request of coupon information on the basis of the comparison result.

For example, the control unit 170 of the information processing device 100 extracts an information processing device (the information processing device outputting the advertisement information) present within a predetermined range (for example, 10 m) from a position (a viewing position) specified by the position information which is received along with the acquisition request of coupon information. In other words, the control unit 170 of the information processing device 100 performs the extraction process on the basis of whether or not a distance between the viewing position and the position (advertisement position) specified by the position information transmitted from the information processing device outputting the advertisement information is within a predetermined range. Specifically, the control unit 170 of the information processing device 100 extracts the information processing device (the information processing device outputting the advertisement information) present within a predetermined range (for example, 10 m) from the viewing position, from information processing devices registered in the advertising activity information storage unit 120. Subsequently, the control unit 170 of the information processing device 100 transmits respective information pieces which are stored in the advertisement information storage unit 130 in correlation with the advertisement information output from the extracted information processing device, to the information processing device 14 via the network 11. For example, the advertisement identification information 131 and the additional information 135 (for example, coupon information) illustrated in FIG. 6 are transmitted as the respective information pieces stored in the advertisement information storage unit 130.

For example, in the example illustrated in FIG. 12, it is assumed that a distance between the position (advertisement position) where the information processing device 200 is located and the position (viewing position) where the information processing device 14 is located is within a predetermined range. For this reason, the control unit 170 of the information processing device 100 extracts the information processing device 200 from the advertising activity information storage unit 120. Next, the control unit 170 of the information processing device 100 transmits the respective coupon information pieces which are stored in the advertisement information storage unit 130 in correlation with the advertisement information output from the extracted information processing device 200, to the information processing device 14 via the network 11.

As described above, in a case where the shaking operation of the information processing device 14 is performed, the coupon information can be acquired on the basis of the position information of both devices.

"Example of Acquiring Coupon Information Using Short-Range Wireless Communication"

For example, a case is assumed in which the person 22 looking at the advertisement information output from the information processing device 200 performs an operation (touch operation) of touching the information processing device 200 with the information processing device 14 in the state illustrated in FIG. 12. In this case, the control unit of the information processing device 14 transmits an acquisition request of coupon information to the information processing device 200 by using short-range wireless communication (for example, NFC). When the acquisition request of coupon information is received, the control unit 270 of the information processing device 200 transmits coupon information which is stored in the advertisement information storage unit 220 in correlation with the advertisement information which is currently output, to the information processing device 14 by using the short-range wireless communication (for example, NFC).

"Example of Acquiring Coupon Information Through Photographing Operation of Advertisement Information"

For example, a case is assumed in which the person 22 looking at the advertisement information output from the information processing device 200 photographs the advertisement by using the information processing device 14 in the state illustrated in FIG. 12. In this case, the information processing device 14 transmits information (image information) regarding an image (image data) generated by the photographing, to the information processing device 100 via the network 11. When the image information is received, the control unit 170 of the information processing device 100 extracts advertisement information including image information which is closest to the received image information from the advertisement information storage unit 130.

Subsequently, the control unit 170 of the information processing device 100 transmits respective information pieces which are stored in the advertisement information storage unit 130 in correlation with the extracted advertisement information, to the information processing device 14 via the network 11.

Figure 13:
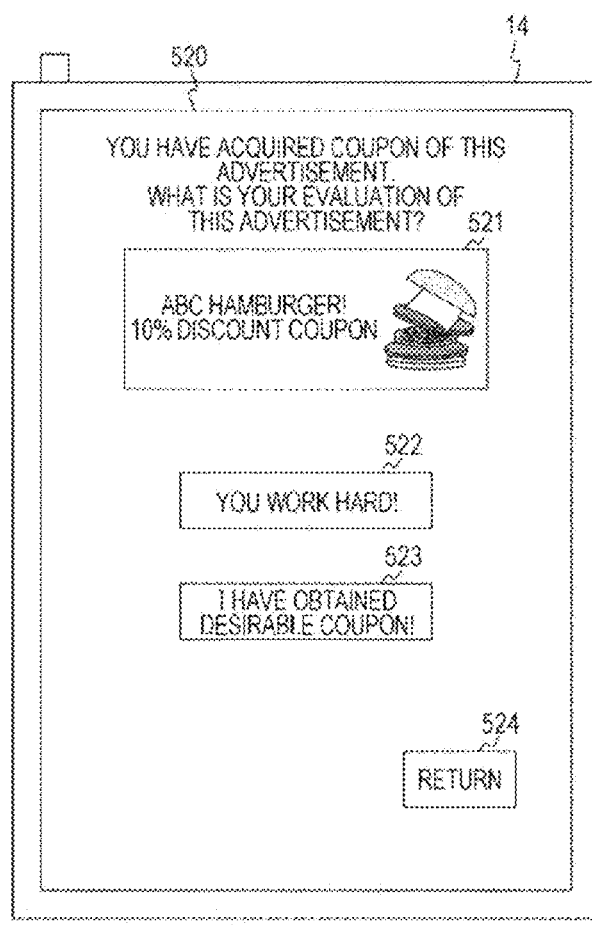
FIG. 13 is a diagram illustrating an example (advertisement evaluation screen) of a display screen which is displayed on an information processing device according to the first embodiment of the present technology.

FIG. 13 illustrates a display example of the coupon information acquired in this way. In addition, in a case where the coupon information is acquired in this way, it is expected that an effect of advertisement information corresponding to the coupon information is large. For this reason, for example, the number of distributions of coupon information (that is, the number of distributed coupons) may be counted, and the number of distributions may be used as effect measurement information.

"Display Example of Advertisement Evaluation Screen"

FIG. 13 is a diagram illustrating an example (advertisement evaluation screen 520) of a display screen displayed on the information processing device 14 according to the first embodiment of the present technology.

The advertisement evaluation screen 520 is, for example, a display screen which is displayed when coupon information regarding the advertisement information output from the information processing device 200 is acquired.

A coupon information display region 521, evaluation buttons 522 and 523, and a return button 524 are displayed on the advertisement evaluation screen 520.

The coupon information display region 521 is a region for displaying image information regarding the acquired coupon information.

The evaluation buttons 522 and 523 are buttons which are pressed when evaluating the person (a person serving as an advertisement medium) having the information processing device which currently outputs the advertisement information regarding the acquired coupon information. For example, when it is felt that the person works hard, the evaluation button 522 is pressed, and thus evaluation information indicating the evaluation is transmitted from the information processing device 14 to the information processing device 100. In addition, for example, it is felt that the coupon information displayed in the coupon information display region 521 is a desirable coupon, the evaluation button 523 is pressed, and thus evaluation information indicating the evaluation is transmitted from the information processing device 14 to the information processing device 100. In other words, the information processing device 14 transmits the evaluation information to the information processing device 100 in response to an operation input using the advertisement evaluation screen 520.

The return button 524 is a button which is pressed when a previously displayed screen is displayed.

In addition, FIG. 13 illustrates an example of evaluating the person (a person serving as an advertisement medium) having the information processing device which currently outputs the advertisement information by using the evaluation buttons 522 and 523, but evaluation may be performed using other evaluation methods. For example, the evaluation may be performed using the imaging unit 230 of the information processing device 200. For example, the person 22 looking at the advertisement information output from the information processing device 200 may make a gesture at the imaging unit 230, thereby performing the evaluation. For example, if the person 22 makes a thumbs-up gesture, this may be regarded as an affirmative evaluation, and if the person 22 makes a thumbs-down gesture, this may be regarded as a negative evaluation.

In a case where the evaluation is performed in this way, for example, the control unit 270 of the information processing device 200 may determine each gesture by performing an image recognition process on an image generated by the imaging unit 230. A method of determining a gesture may use a well-known determining method (for example, refer to Japanese Unexamined Patent Application Publication No. 2011-85966). In addition, the control unit 270 transmits evaluation information (evaluation information corresponding to the determined gesture) based on the determination result, to the information processing device 100 via the network 11.

As above, the person looking at the advertisement can evaluate the advertising activity conducted by the person serving as an advertisement medium. In addition, the evaluation may be collected by the manager who manages the advertisement information and may be used in treatment of the person serving as an advertisement medium. For example, a person (a person serving as an advertisement medium) who is highly evaluated may receive good treatment such as a rise in a unit cost of an advertising activity.

"Communication Example"

Figure 14:
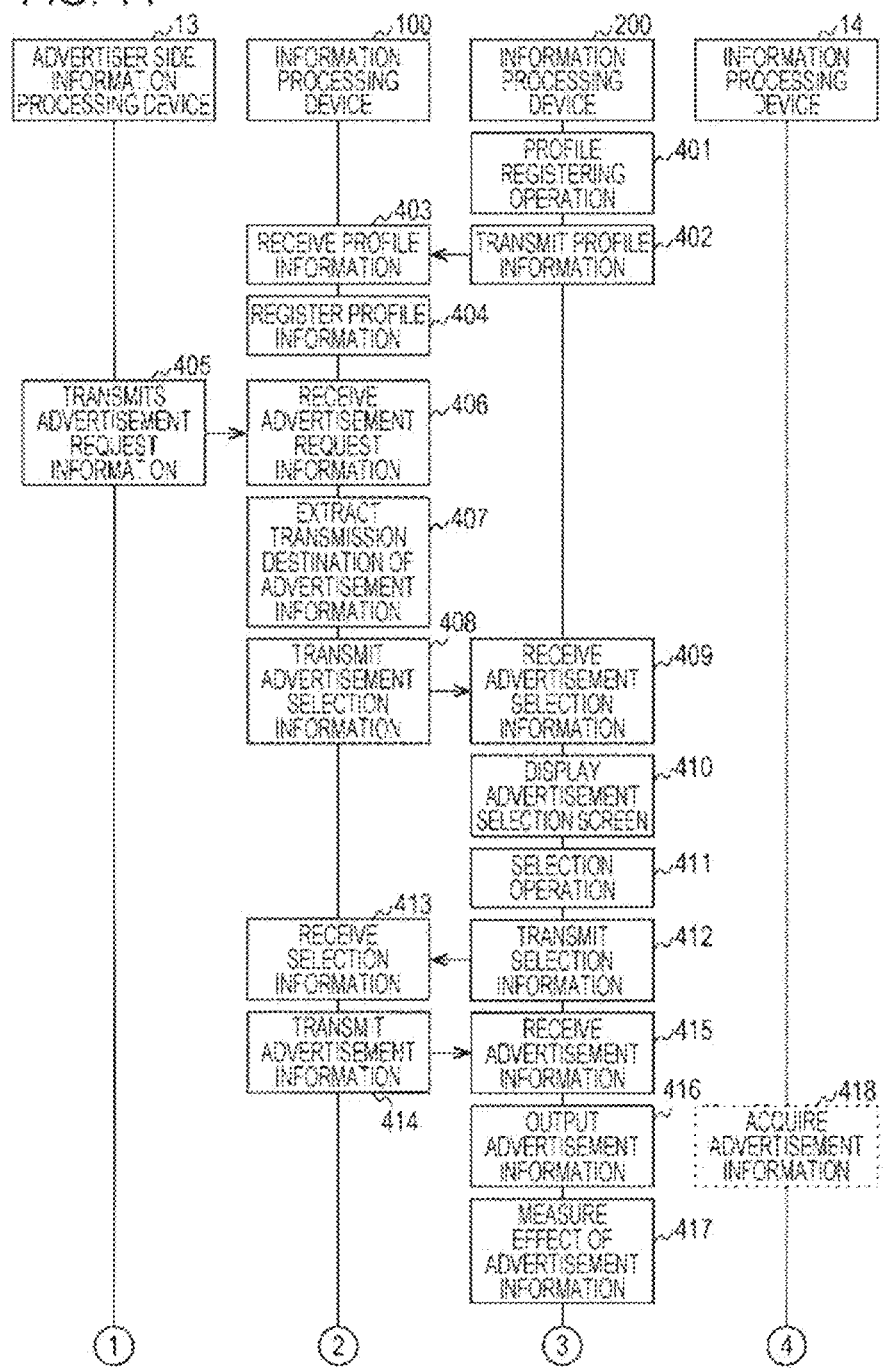
FIG. 14 is a sequence chart illustrating a communication processing example between respective devices forming the communication system according to the first embodiment of the present technology.
Figure 15:
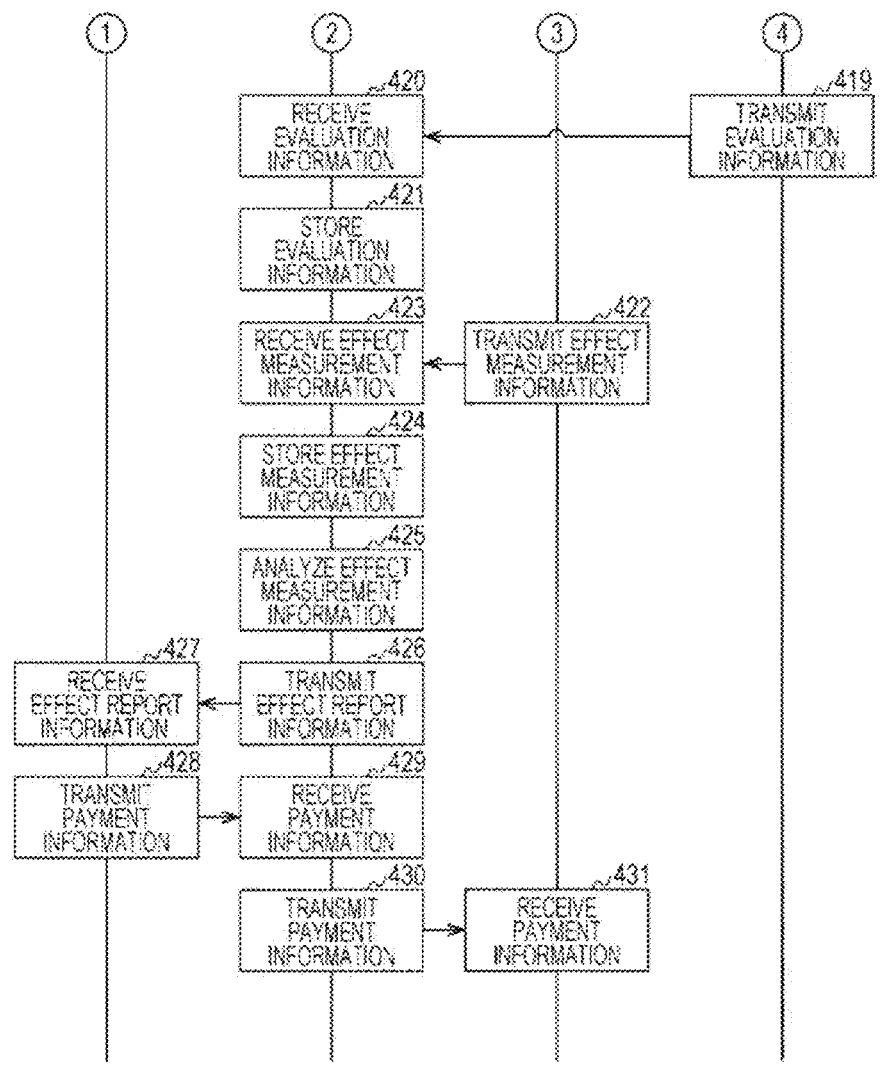
FIG. 15 is a sequence chart illustrating a communication processing example between respective devices forming the communication system according to the first embodiment of the present technology.

FIGS. 14 and 15 are sequence charts illustrating a communication processing example between the respective devices forming the communication system 10 according to the first embodiment of the present technology.

First, the person 21 (illustrated in FIG. 1) performs a profile registration operation for registering his or her own profile in the information processing device 100 by using the information processing device 200 (401). For example, the control unit 270 of the information processing device 200 displays a profile registration screen for performing the profile registration operation on the display unit 280 on the basis of information from the information processing device 100. In addition, the person 21 performs a registration operation of his or her own profile by using the profile registration screen (401). For example, an input operation of the respective information pieces (the personal attribute information 112 and the behavior information 113) illustrated in FIG. 4 or an attachment operation of his or her own pictures (for example, a face picture, and front and back whole body pictures) is performed.

Subsequently, the control unit 270 of the information processing device 200 transmits the profile information to be registered in the information processing device 100, to the information processing device 100 via the network 11 in response to the profile registration operation (402 and 403). When the profile information is received (403), the control unit 170 of the information processing device 100 registers the received profile information (404). For example, the control unit 170 of the information processing device 100 stores information (for example, the personal attribute information 112 and the behavior information 113 illustrated in FIG. 4) which does not have to be determined by a person in the received profile information, in the profile information storage unit 110 as it is. On the other hand, the manager who manages the information processing device 100 registers information (for example, the appearance information 114 illustrated in FIG. 4) which has to be determined by a person in the received profile information by referring to the received profile information.

As described above, the person 21 having the information processing device 200 performs the profile registration operation, and thus the person 21 can conduct an activity as an advertisement medium.

In addition, the advertiser side information processing device 13 transmits advertisement request information to the information processing device 100 via the network 11 (405 and 406). The advertisement request information is transmitted to the information processing device 100 by an advertiser performing an advertisement request operation by using the advertiser side information processing device 13 (405 and 406). The advertisement request information includes information (for example, advertisement information (advertisement image information and advertisement sound information), an advertisement place, an advertisement period, coupons regarding the advertisement, and a price of the advertisement) regarding an advertisement requested by the advertiser.

When the advertisement request information is received (406), the extraction unit 160 of the information processing device 100 extracts a transmission destination (a person registered as an advertisement medium) of advertisement information corresponding to the received advertisement request information (407). This extraction process may be automatically performed by the extraction unit 160 on the basis of the received advertisement request information, and may be performed through a manual operation (for example, a manual operation using the advertisement medium selection screen 500 illustrated in FIG. 7) by the manager who manages the information processing device 100. In addition, this extraction procedure (407) is an example of an extraction procedure.

For example, the extraction unit 160 of the information processing device 100 extracts an appropriate transmission destination of the advertisement information among individuals stored in the profile information storage unit 110 on the basis of the received advertisement request information or items selected through the manual operation (407). In other words, the extraction unit 160 of the information processing device 100 extracts a person who satisfies an output condition from a plurality of persons on the basis of the output condition regarding the advertisement information which is a output target and the profile information stored in the profile information storage unit 110 (407).

For example, a case is assumed in which the extraction unit 160 performs automatic extraction on the basis of the received advertisement request information. Here, a description will be made with reference to the profile information storage unit 110 illustrated in FIG. 4.

For example, a case is assumed in which advertisement request information regarding an advertisement of cosmetics or false eyelashes is received. In this case, the extraction unit 160 may extract a person (for example, the person whose personal identification information 111 is "P0002") for whom "female" is registered in the gender of the personal attribute information 112, and "big eyes" is registered in the feature of the appearance information 114. In addition, for example, a case is assumed in which advertisement request information regarding an advertisement of a hair tonic or a shaver is received. In this case, the extraction unit 160 may extract a person (for example, the person whose personal identification information 111 is "P0003") for whom "male" is registered in the gender of the personal attribute information 112, and "handsome" is registered in the feature of the appearance information 114.

Further, for example, a case is assumed in which advertisement request information regarding an advertisement of a shampoo or a beauty parlor is received. In this case, the extraction unit 160 may extract a person (for example, the person whose personal identification information 111 is "P0004") for whom "female" is registered in the gender of the personal attribute information 112, and "silky hair" is registered in the feature of the appearance information 114. Furthermore, for example, a case is assumed in which advertisement request information regarding a hand cream is received. In this case, the extraction unit 160 may extract a person (for example, the person whose personal identification information 111 is "P0005") for whom "female" is registered in the gender of the personal attribute information 112, and "pretty hands" is registered in the feature of the appearance information 114.

Moreover, for example, a case is assumed in which advertisement request information regarding an advertisement of stockings is received. In this case, the extraction unit 160 may extract a person (for example, the person whose personal identification information 111 is "P0006") for whom "female" is registered in the gender of the personal attribute information 112, and "slim legs" is registered in the feature of the appearance information 114. In addition, for example, a case is assumed in which advertisement request information regarding an advertisement of hair dyeing or a beauty parlor is received. In this case, the extraction unit 160 may extract a person (for example, the person whose personal identification information 111 is "P0004") for whom "female" is registered in the gender of the personal attribute information 112, and "golden hair" is registered in the hair style of the appearance information 114. Further, for example, a case is assumed in which advertisement request information regarding an advertisement of spectacles is received. In this case, the extraction unit 160 may extract a person (for example, the person whose personal identification information 111 is "P0007") for whom "in-spectacles" is registered in the feature of the appearance information 114.

Furthermore, the extraction unit 160 extracts a transmission destination (a person registered as an advertisement medium) of the advertisement information in consideration of the personal attribute information 112 and the behavior information 113 (illustrated in FIG. 4) of the profile information storage unit 110, from the persons extracted in this way (407).

Next, the control unit 170 of the information processing device 100 transmits, to the extracted transmission destination (the person), advertisement selection information for the person selecting outputting of the advertisement information as an advertisement medium (408 and 409). In FIG. 14, it is assumed that the information processing device 200 is extracted as the transmission destination. For this reason, the control unit 170 of the information processing device 100 transmits the advertisement selection information to the information processing device 200 via the network 11 (408 and 409).

When the advertisement selection information is received (408 and 409), the control unit 270 of the information processing device 200 displays an advertisement selection screen on the display unit 280 on the basis of the received advertisement selection information (410). For example, the advertisement selection screen 510 illustrated in FIG. 10 is displayed on the display unit 280. The person 21 performs a selection operation for selecting a desired advertisement by using the advertisement selection screen (411). For example, an advertisement (the advertisement information selection icon 512) of an ABC hamburger, displayed on the advertisement selection screen 510 illustrated in FIG. 10, is selected. As above, in a case where the selection operation of selecting the desired advertisement is performed (411), the control unit 270 of the information processing device 200 transmits selection information related to the selection operation to the information processing device 100 via the network 11 (412 and 413).

When the selection information is received (413), the control unit 170 of the information processing device 100 transmits advertisement information corresponding to the received selection information to the information processing device 200 which has transmitted the selection information, via the network 11 (414 and 415). In addition, these control procedures (408, 413, and 414) are an example of a control procedure.

Next, the control unit 270 of the information processing device 200 outputs the received advertisement information (416). For example, in a case where image information is included in the received advertisement information, the control unit 270 of the information processing device 200 displays the image information on the display unit 280 (416). In addition, for example, in a case where sound information is included in the received advertisement information, the control unit 270 of the information processing device 200 outputs the sound information from the sound output unit 290 (416). For example, as illustrated in FIG. 2, the advertisement information is output (416).

Other persons (for example, the person 22 illustrated in FIG. 1) can acquire the advertisement information which is output in this way. For example, in a case where the advertisement information is displayed as image information, the person 22 having the information processing device 14 looks at the image information so as to acquire the advertisement information (418). In addition, for example, in a case where the advertisement information is output as sound information, the person 22 hears the sound information so as to acquire the advertisement information (418).

Further, the control unit 270 of the information processing device 200 starts a measurement process for measuring an effect of the advertisement information at a timing when the advertisement information starts to be output (417). Specifically, the control unit 270 of the information processing device 200 measures each information piece stored in the effect measurement information 123 (illustrated in FIG. 5) of the advertising activity information storage unit 120 (417). Furthermore, this measurement process will be described in detail with reference to FIG. 16.

In addition, the person 22 (418) who acquires the advertisement information output from the information processing device 200 may transmit evaluation information for evaluating the outputting of the advertisement information to the information processing device 100 via the network 11 (419 and 420). For example, the evaluation information may be transmitted from the information processing device 14 of the person 22 to the information processing device 100 by performing a pressing operation of pressing a desired button (the evaluation buttons 522 and 523) on the advertisement evaluation screen 520 illustrated in FIG. 13. In this case, the information processing device 14 transmits advertisement identification information (for example, the advertisement identification information 131 illustrated in FIG. 6) for specifying the advertisement on which the pressing operation has been performed, in correlation with the evaluation information. It is possible to specify to which advertisement information the evaluation information corresponds on the basis of the advertisement identification information transmitted in this way. Further, position information (for example, latitude and longitude) for specifying a position where the information processing device 14 is located may be transmitted in correlation with the evaluation information, and to which advertisement information the evaluation information corresponds may be specified.

When the evaluation information is received (420), the control unit 170 of the information processing device 100 stores the received evaluation information in the advertising activity information storage unit 120 (421). For example, in a case where the evaluation button 522 on the advertisement evaluation screen 520 illustrated in FIG. 13 is pressed, 1 is added to "You work hard" of the evaluation information 124 of the advertising activity information storage unit 120 illustrated in FIG. 5. In addition, for example, in a case where the evaluation button 523 on the advertisement evaluation screen 520 is pressed, 1 is added to "I have obtained desirable coupon" of the evaluation information 124 of the advertising activity information storage unit 120.

Further, the control unit 270 of the information processing device 200 transmits information (the effect measurement information (including the personal identification information 121 and the advertisement identification information 122 illustrated in FIG. 5)) generated due to the measurement process, to the information processing device 100 via the network 11 (422 and 423). The effect measurement information may be transmitted, for example, at a timing when the outputting of the advertisement information finishes, and may be transmitted at periodic or aperiodic timings. For example, in such a case where the person 21 serving as an advertisement medium moves, the effect measurement information may be transmitted at a timing when a movement amount thereof exceeds a predetermined amount.

When the effect measurement information is received (423), the control unit 170 of the information processing device 100 stores the received effect measurement information in the effect measurement information 123 of the advertising activity information storage unit 120 illustrated in FIG. 5 (424).

Subsequently, the control unit 170 of the information processing device 100 analyzes the respective information pieces stored in the advertising activity information storage unit 120 illustrated in FIG. 5 so as to generate effect report information which will be transmitted to the advertiser (425). The effect report information may be automatically generated, for example, on the basis of analysis of the respective information pieces (the effect measurement information 123 and the evaluation information 124) stored in the advertising activity information storage unit 120. For example, the information stored in each of the effect measurement information 123 and the evaluation information 124 illustrated in FIG. 5 may be digitalized, and calculation (for example, addition) of the digitalized information may be performed, thereby generating the effect report information. In addition, the manager who manages the information processing device 100 may analyze some or all of the respective information pieces stored in the advertising activity information storage unit 120 so as to generate the effect report information.

Next, the control unit 170 of the information processing device 100 transmits the generated effect report information to the advertiser side information processing device 13 via the network 11 (426 and 427). When the effect report information is received (427), the advertiser side information processing device 13 transmits payment information for making a payment to the person serving as an advertisement medium by referring to the received advertisement request information, to the information processing device 100 via the network 11 (428 and 429).

When the payment information is received (429), the control unit 170 of the information processing device 100 transmits payment information for making a payment to the person 21 serving as an advertisement medium by referring to the received payment information, to the information processing device 200 via the network 11 (430 and 431). This payment information is determined, for example, in consideration of grading information (for example, the grading information 115 illustrated in FIG. 4, or the grading information 125 illustrated in FIG. 5). In addition, a size (display area) of the display unit of the information processing device of the advertisement medium side may be stored in correlation with the profile information, and the payment information may be determined in consideration of the size of the display unit. For example, in a case where the size of the display unit is greater than a threshold value, payment information to which an incentive is added may be determined.

Further, a reward may be determined in consideration of information. For example, an advertisement effect is different for a person who has conducted an advertising activity around Shibuya Station for five hours and a person who has conducted an advertising activity in the country where there are few people for five hours, and thus a reward may be determined in consideration of this fact. A high incentive is added to the person who has conducted an advertising activity around Shibuya Station for five hours, and a low incentive is added to the person who has conducted an advertising activity in the country where there are few people for five hours. Furthermore, it is possible to enhance an advertisement effect by intensively performing advertising at a time. For this reason, a high incentive may be given to a person who participates in advertising at a place where the advertising is intensively performed at a time. Therefore, persons serving as an advertisement medium are in search of high compensation, and thus it is possible to further enhance an advertisement effect.

In addition, the payment information may be transmitted every time an advertising activity is completed, and may be transmitted every predetermined period (for example, every week or every month).

Further, a reward (a reward to the person serving as an advertisement medium) based on the payment information may be not only a cash, but also a coupon (for example, a coupon (discount coupon) regarding the advertisement), goods (advertised goods), points (points regarding the advertisement). Furthermore, for example, a person who has conducted an advertising activity at a specific place may be given advertisement goods distributed at the specific place as a reward.

"Operation Example of Information Processing Device of Advertisement Medium Side"

Figure 16:
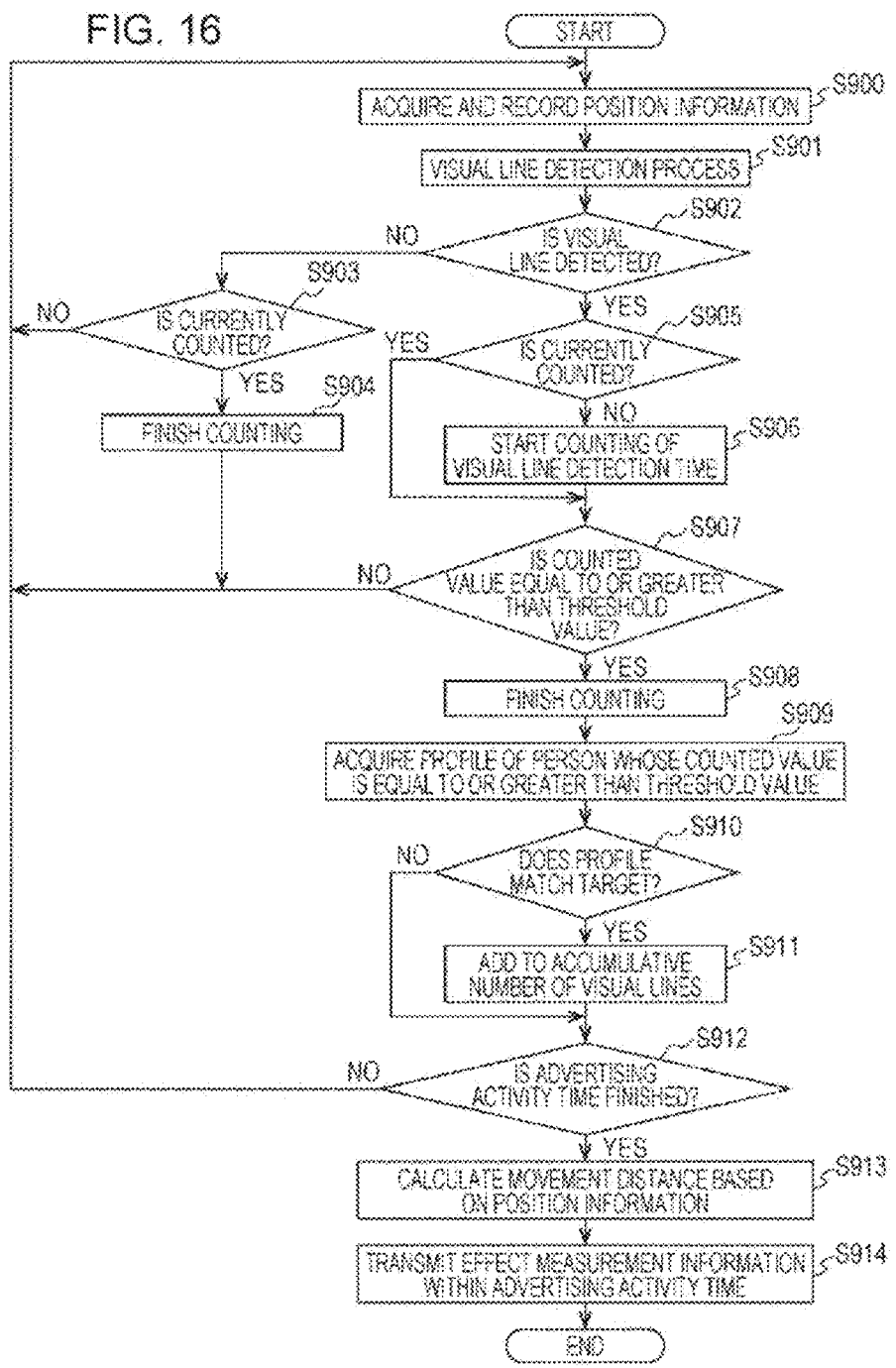
FIG. 16 is a flowchart illustrating an example of process procedures of an effect measurement process performed by the information processing device according to the first embodiment of the present technology.

FIG. 16 is a flowchart illustrating an example of process procedures of an effect measurement process by the information processing device 200 according to the first embodiment of the present technology. FIG. 16 illustrates an example in which, when the same visual line is detected for a predetermined time or more, the number of detections is counted and is set as the number of visual lines.

In addition, the effect measurement process is assumed to be performed from starting of an advertising activity to finishing of the advertising activity. Here, timings when the advertising activity starts will be described. For example, when the advertisement timing of the additional information 225 of the advertisement information storage unit 220 illustrated in FIG. 9 arrives, advertisement information (outputting of the advertisement information) may automatically start. In addition, for example, in a case where a manual operation for starting an advertising activity is performed by a person serving as an advertisement medium, the advertisement information may start.

First, the control unit 270 records position information acquired by the position information acquisition unit 240 in the effect measurement information 226 (illustrated in FIG. 9) of the advertisement information storage unit 220 (step S900). In this case, the control unit 270 may specify a place where the information processing device 200 is located on the basis of the position information acquired by the position information acquisition unit 240. In this case, information (for example, a place name) regarding the specified place may be recorded as an activity place of the effect measurement information 226 of the advertisement information storage unit 220. In addition, the control unit 270 starts counting for measuring an activity time of the advertising activity.

Subsequently, the control unit 270 acquires an image generated by the imaging unit 230, and performs a visual line detection process on the image (step S901).

Here, the visual line detection process will be described. For example, the control unit 270 performs a face detection process of detecting a face of a person from the image generated by the imaging unit 230. As the face detection method, for example, a face detection method (for example, refer to Japanese Unexamined Patent Application Publication No. 2004-133637) performed by matching a template in which face luminance distribution information is recorded with a real image, a face detection method based on a feature amount of a skin-colored part or a human face included in image data, and the like may be used. In addition, for example, in a case where a person's face is detected from the image generated by the imaging unit 230, the control unit 270 performs an iris detection process of detecting the irises included in the face. As the iris detection method, for example, in the same manner as the face detection method, an iris detection method performed by matching a template in which iris luminance distribution information is recorded with a real image, or the like, may be used. Further, for example, in a case where the iris is detected from the face, the control unit 270 may determine that the visual line is detected.

In addition, for example, the control unit 270 may set only a person's face detected from a predetermined range (for example, a middle part) in the image generated by the imaging unit 230 as a the visual line detection target. In this case, when a position (a position in the entire eye) of the iris detected from the face is a predetermined position (for example, a middle part), the control unit 270 may determine that the visual line is detected.

Further, a visual point may be detected using other methods. For example, a visual point may be detected using an eye-tracking (visual line analysis) method.

Subsequently, the control unit 270 determines whether or not the visual line is detected (step S902). If the visual line is not detected (step S902), the control unit 270 determines whether or not counting (counting of a visual line detection time) is currently performed (step S903). In addition, if the counting is not currently performed (step S903), the flow returns to step S900. On the other hand, if the counting is currently performed (step S903), the control unit 270 finishes the counting (step S904), the flow returns to step S900.

In addition, if the visual line is detected (step S902), the control unit 270 determines whether or not the counting is currently performed (step S905). Further, if the counting is currently performed (step S905), the flow proceeds to step S907. On the other hand, if the counting is not currently performed (step S905), the control unit 270 starts counting of a visual line detection time (step S906).

Next, the control unit 270 determines whether or not a counted value is equal to or greater than a threshold value (step S907). In addition, if the counted value is smaller than the threshold value (step S907), the flow returns to step S900. On the other hand, if the counted value is equal to or greater than the threshold value (step S907), the control unit 270 finishes the counting of a visual line detection time (step S908).

Subsequently, the control unit 270 performs a profile detection process of detecting a profile regarding a person with visual lines whose counted value is equal to or greater than the threshold value (step S909).

Here, a detection method of detecting a profile regarding the person will be described.

For example, the control unit 270 holds information (profile information) regarding a profile to be detected. In addition, the control unit 270 detects a profile of the person (the person with visual lines whose counted value is equal to or greater than the threshold value) included in the image generated by the imaging unit 230, by using the held profile information.

For example, a detection method of using a matching process may be used as the detection method of detecting a profile. This matching process is a process in which feature amounts of two images which are comparison targets are compared with each other, a similarity of the feature amounts of the two images is calculated on the basis of the comparison result, and it is determined whether or not the two images match each other on the basis of the similarity. For example, in a case where the calculated similarity is smaller than a threshold value, it is determined that the two images which are comparison targets do not match each other, and, in a case where the calculated similarity is equal to or greater than the threshold value, it is determined that the two images which are comparison targets match each other. In the matching process, for example, a determination method (for example, refer to Japanese Unexamined Patent Application Publication No. 2004-133637) performed by matching a template in which luminance distribution information of each target object (for example, a child, a gender, and a face corresponding to an age) is recorded with a real image, may be used. In addition, a determination method based on a feature amount of a skin-colored part or a human face included in an image may be used.

Further, other detection methods may be used. For example, a detection method in which each attribute (for example, a child, a gender, and an age) is detected by a weak discriminator using a luminance difference value between two points in an image (face image) including a person's face (for example, refer to Japanese Unexamined Patent Application Publication No. 2009-118009).

Next, the control unit 270 determines whether or not the detected profile matches a profile (for example, the profile information 224 of the advertisement information storage unit 220 illustrated in FIG. 9) which is a target of advertisement information (step S910). In addition, if the profiles do not match each other (step S910), the flow proceeds to step S912. On the other hand, if the profiles match each other (step S910), the control unit 270 adds 1 to the accumulative number of visual lines in correlation with the advertisement information which is currently output (step S911). For example, 1 is added to the number of visual lines of the effect measurement information 226 of the advertisement information storage unit 220 illustrated in FIG. 9 (step S911).

Here, the control unit 270 may sequentially hold the detected profiles so as to totalize persons who look at the advertisement information which is currently output. In addition, the control unit 270 may include the profile information (for example, a total number of persons who have looked at the advertisement information for each gender and for each age) totalized in this way in the effect measurement information so as to transmit resultant information to the information processing device 100 (step S914).

Next, the control unit 270 determines whether or not the advertising activity is finished (step S912). For example, it is determined whether or not the advertisement time zone of the additional information 225 of the advertisement information storage unit 220 illustrated in FIG. 9 has elapsed (step S912). In addition, the advertising activity may be finished by a manual operation of the person serving as an advertisement medium.

Further, if the advertising activity is not finished (step S912), the flow returns to step S900. On the other hand, if the advertising activity is finished (step S912), the control unit 270 calculates a distance by which the information processing device 200 moves on the basis of position information acquired when the advertising activity starts and position information acquired immediately before the advertising activity is finished (step S913). In addition, the control unit 270 records the calculated distance in the movement distance (illustrated in FIG. 9) of the effect measurement information 226 of the advertisement information storage unit 220. Further, the control unit 270 counts an activity time from the time when the advertising activity starts, and records the activity time in the activity time of the effect measurement information 226 of the advertisement information storage unit 220. Furthermore, the control unit 270 may acquire and record effect measurement information other than this effect measurement information. Moreover, a case is also expected in which the person conducting the advertising activity reciprocally moves on a road, or the person walks along a winding road. Therefore, the control unit 270 may calculate a movement distance based on position information which is acquired at predetermined intervals during the advertising activity and record the movement distance, in addition to calculation of a movement distance based on each position information piece acquired when the advertising activity starts and immediately before the advertising activity is finished.

Subsequently, the control unit 270 transmits the effect measurement information in which the advertising activity is recorded, to the information processing device 100 via the network 11 (step S914).

In addition, preferably, a person whose accumulative number of visual lines has been added is not detected in a subsequent visual line detection process. For this reason, for example, the control unit 270 may hold a face image including a face of a person used in the profile detection process, and may not set a person with the same face as the face included in the held face image as a visual line detection process target.

In addition, in this example, the information processing device 200 of the advertisement medium side performs the visual line detection process and the profile detection process. However, all or some of the respective processes may be performed by another device (for example, the information processing device 100). In this case, the information processing device 200 may transmit an image (image data) generated by the imaging unit 230 to another device, and may acquire a result of each process by another device so as to perform an effect measurement process.

In addition, FIG. 16 illustrates an example in which an advertising activity is finished due to the elapse of an advertisement time zone or a finishing operation. Here, for example, if a visual line is not detected for a predetermined time (for example, 14 minutes) or more, it may be considered that an advertising activity is not appropriate at the place. Therefore, if a visual line is not detected for a predetermined time or more, the control unit 270 may finish the advertising activity automatically. In this case, for example, the control unit 270 may output (display or output as a sound) a message for finishing the advertising activity. In addition, for example, in a case where a visual line is not detected for a predetermined time or more, the control unit 270 may output (display or output as a sound) a message for prompting the person to change a place and to conduct the advertising activity.

"Acquisition Example of Coupon Information in Case where there are a Plurality of Persons Serving as an Advertisement Medium"

In the above-described description, a description has been made of an example in which a single person 21 serving as an advertisement medium conducts an advertising activity. Here, for example, it is also assumed that a plurality of persons serving as an advertisement medium conduct advertising activities in a relatively narrow range. Therefore, hereinafter, a description will be made of an example of a case where a person looking at an advertisement acquires coupon information regarding advertising activities in a case where a plurality of persons serving as an advertisement medium conduct the advertising activities in a relatively narrow range.

Figure 17:
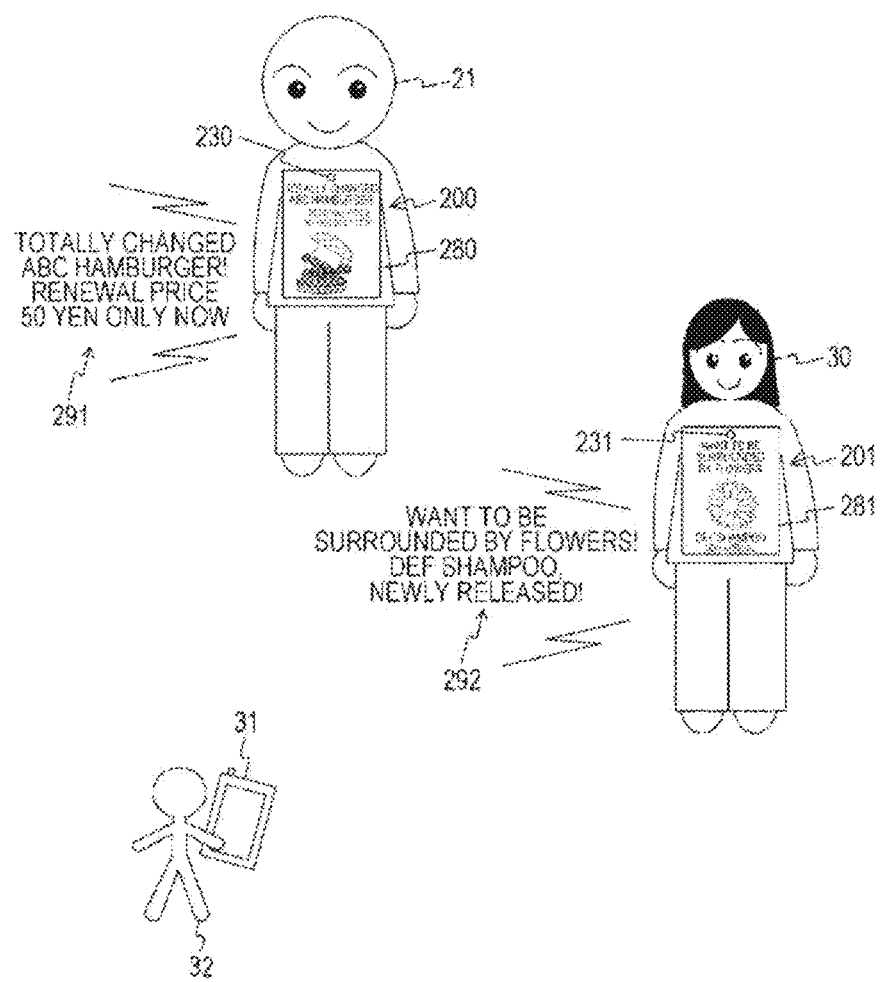
FIG. 17 is a diagram illustrating an acquisition example in a case where coupon information regarding advertisement information output from the information processing devices is acquired according to the first embodiment of the present technology.

FIG. 17 is a diagram illustrating an acquisition example of a case of acquiring coupon information regarding advertisement information output from the information processing devices 200 and 201 according to the first embodiment of the present technology. In addition, a configuration of the information processing device 201 is assumed to be the same as the configuration of the information processing device 200 illustrated in FIG. 1. Further, an imaging unit 231 and a display unit 281 respectively correspond to the imaging unit 230 and the display unit 280. Furthermore, a configuration of an information processing device 31 is assumed to be also the same as the configurations of the information processing devices 21 and 22 illustrated in FIG. 1.

FIG. 17 illustrates an example of a case where a person 32 looking at an advertisement acquires each coupon information piece regarding advertisement information output from the information processing devices 200 and 201 by performing a shaking operation. In addition, FIG. 17 illustrates an example of a case where the person 32 evaluates the advertisement information after acquiring coupon information.

For example, the person 32 looking at the advertisement information output from the information processing devices 200 and 201 performs a shaking operation by using the information processing device 31. In a case where the shaking operation is performed as above, a control unit of the information processing device 31 transmits an acquisition request of coupon information and position information acquired by a position information acquisition unit to the information processing device 100 via the network 11 as described above. When the acquisition request of coupon information and the position information are received, the control unit 170 of the information processing device 100 compares the received position information with position information which is transmitted from the information processing devices which currently output the advertisement information. In addition, the control unit 170 of the information processing device 100 determines which advertisement information is related to the acquisition request of coupon information on the basis of the comparison result.

Here, in the example illustrated in FIG. 17, it is assumed that a distance between the position (advertisement position) where the information processing device 200 is located and the position (viewing position) where the information processing device 31 is located is within a predetermined range. Similarly, it is assumed that a distance between the position (advertisement position) where the information processing device 201 is located and the viewing position is within a predetermined range. For this reason, the control unit 170 of the information processing device 100 extracts each of the information processing devices 200 and 201 from the advertising activity information storage unit 120. Next, the control unit 170 of the information processing device 100 transmits the respective coupon information pieces which are stored in the advertisement information storage unit 130 in correlation with the advertisement information output from the extracted information processing devices 200 and 201, to the information processing device 31 via the network 11.

As described above, in a case where the shaking operation of the information processing device 31 is performed, the coupon information regarding the two advertisement information pieces can be acquired together. In addition, FIG. 18 illustrates a display example of the coupon information acquired in this way.

Further, respective information pieces regarding a visual line detection position in the information processing device 200 may be sequentially transmitted to the information processing device 100, and coupon information may be downloaded on the basis of a result of the visual line detection process. For example, in a case where a visual line is detected and a visual line detection time starts to be counted in the visual line detection process, the control unit 270 of the information processing device 200 transmits information (counting start information) indicating the counting start to the information processing device 100. In this case, the control unit 170 of the information processing device 100 can transmit coupon information only in a case where the acquisition request of coupon information is received within a predetermined time (for example, ten seconds) from the time when the counting start information is received. For example, the control unit 170 of the information processing device 100 may transmit coupon information regarding advertisement information output from the information processing device 200 which has transmitted the counting start information, to the information processing device which has transmitted the acquisition request of the coupon information.

"Display Example of Advertisement Evaluation Screen"

Figure 18:
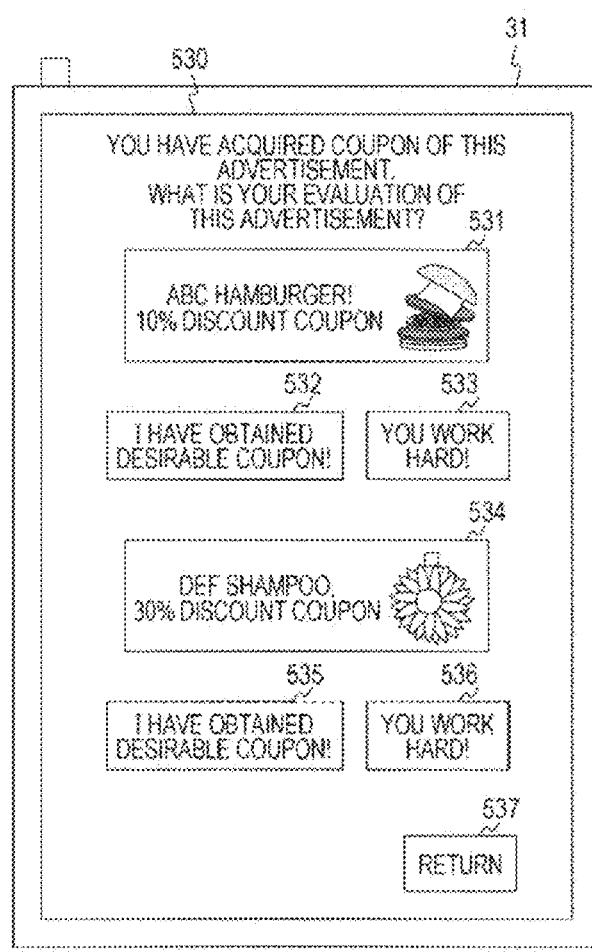
FIG. 18 is a diagram illustrating an example (advertisement evaluation screen) of a display screen which is displayed on an information processing device according to the first embodiment of the present technology.

FIG. 18 is a diagram illustrating an example (advertisement evaluation screen 530) of a display screen which is displayed on the information processing device 31 according to the first embodiment of the present technology.

The advertisement evaluation screen 530 is, for example, a display screen displayed when coupon information regarding advertisement information output from the information processing devices 200 and 201 is acquired.

Coupon information display regions 531 and 534, evaluation buttons 532, 533, 535 and 536, and a return button 537 are displayed on the advertisement evaluation screen 530. In addition, the coupon information display regions 531 and 534 correspond to the coupon information display region 521 illustrated in FIG. 13. Further, the evaluation buttons 532 and 535 correspond to the evaluation button 522 illustrated in FIG. 13, and the evaluation buttons 533 and 536 correspond to the evaluation button 523 illustrated in FIG. 13. Furthermore, the return button 537 corresponds to the return button 524 illustrated in FIG. 13.

As above, the person 32 looking at the advertisement information output from the information processing devices 200 and 201 may evaluate a person (a person serving as an advertisement medium) having an information processing device which outputs desired advertisement information, by using the advertisement evaluation screen 530.

In addition, FIG. 18 illustrates an example in which both coupon information pieces of the information processing devices 200 and 201 which are present within a predetermined range from the position where the information processing device 31 is located are acquired, but, for example, only coupon information which is desired to be acquired by the person 32 may be acquired. For example, before coupon information is acquired, the information processing device 31 acquires list information for displaying a list of coupon information from the information processing device 100. Subsequently, the information processing device 31 displays a coupon selection screen for selecting desired coupon information on the basis of the list information. Next, the information processing device 31 transmits an acquisition request of coupon information for acquiring selected coupon information on the coupon selection screen to the information processing device 100. Accordingly, the information processing device 31 can acquire only desired coupon information.

2. Second Embodiment

In the first embodiment of the present technology, a description has been made of an example in which the number of visual lines, a movement distance, an activity place, an activity time, and the like are used as effect measurement information. Here, it is estimated that an advertisement effect is large, for example, if a person serving as an advertisement medium gives a certain performance. Therefore, it is possible to further enhance the desire of a person serving as an advertisement medium by giving an incentive to the person who conducts an advertising activity which is estimated to have a large advertisement effect.

Therefore, in the second embodiment of the present technology, a description will be made of an example in which an incentive is given to an advertising activity which is estimated to have a large advertisement effect. In addition, each device forming a communication system according to the second embodiment of the present technology corresponds to each device forming the communication system 10 illustrated in FIG. 1. For this reason, each device according to the second embodiment of the present technology is given the same reference numeral as in the first embodiment of the present technology, and description thereof will be partially omitted.

"Example of Case where Person Serving as Advertisement Medium Gives Performance"

FIG. 19 is a diagram illustrating an example of a case where a person 40 who has the information processing device 200 according to the second embodiment of the present technology and serves as an advertisement medium gives a certain performance.

As illustrated in FIG. 19, in a case where the person 40 who has the information processing device 200 and serves as an advertisement medium gives a certain performance (for example, dancing), an incentive is given to this advertising activity. For example, if the person dances, a motion (changes in a posture) is detected by the posture detection unit 250. In this case, the control unit 270 may determine an incentive for the advertising activity on the basis of posture information regarding the changes in a posture which are detected by the posture detection unit 250. For example, in a case where changes in a posture last for a predetermined period greater than a threshold value which is used as a reference (for example, in a case where the person does a fast dance for a long time), the control unit 270 may determine a high incentive. In addition, the control unit 270 stores the incentive determined in this way in the advertisement information storage unit 220 illustrated in FIG. 9 as the effect measurement information. In other words, the control unit 270 may determine an activity state of the person 40 on the basis of the changes in a posture detected by the posture detection unit 250, and generate effect measurement information on the basis of the determination result. Further, the control unit 270 transmits the stored incentive to the information processing device 100 as the effect measurement information. Furthermore, the information processing device 100 may determine grading information or a reward in consideration of the incentive.

Accordingly, for example, it is possible to appropriately evaluate a person who conducts an advertising activity while giving a certain performance (good dance or good running).

In addition, whether or not a certain performance is given may be determined using other methods. For example, the determination may be performed using a biological sensor. For example, an amount of sweat is detected using a biological sensor which can detect the sweat. Further, for example, the control unit 270 may determine an incentive on the basis of the amount of sweat. For example, in a case where the amount of sweat is larger than a threshold value which is used as a reference (for example, in a case where the person does a fast dance), the control unit 270 may determine a high incentive.

In addition, other activity content (for example, running, a street dance, an advertising activity by a group behavior, and an advertising activity by a couple) may be determined, and an incentive may be determined on the basis of this determination result.

3. Modification Examples

In the first and second embodiments of the present technology, a description has been made of an example in which the information processing device 200 of the advertisement medium side is attached to the clothes worn by the person serving as an advertisement medium. However, the information processing device of the advertisement medium side may be attached to other parts of the person serving as an advertisement medium. In addition, the information processing device of the advertisement medium side may be attached to things (for example, a vehicle) which are privately used by a person serving as an advertisement medium.

Therefore, in the modification example of the present technology, a description will be made of an example in which the information processing device of the advertisement medium side is attached to other parts of the person serving as an advertisement medium or things (for example, a vehicle) privately used by the person serving as an advertisement medium.

"Example of Attaching Information Processing Device of Advertisement Medium Side to Cap"

Figure 20:
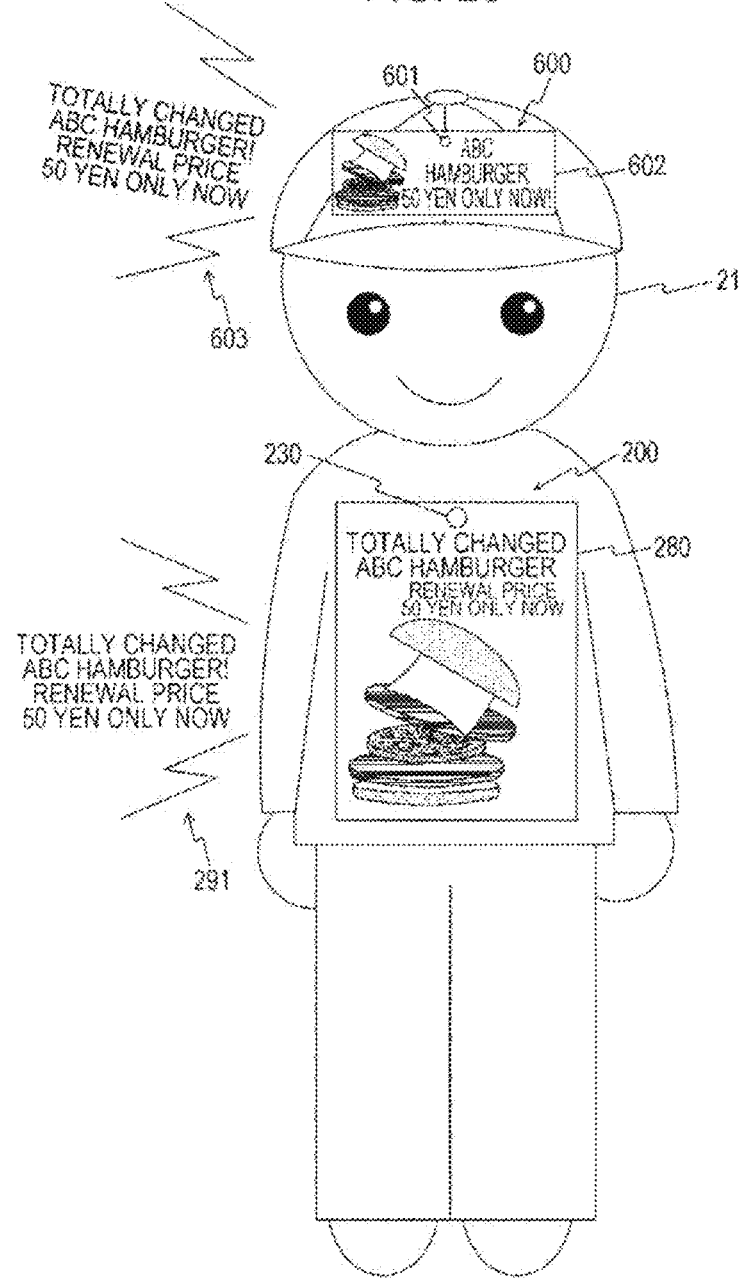
FIG. 20 is a diagram illustrating a use example of information processing devices in a modification example of the embodiments of the present technology.

FIG. 20 is a diagram illustrating a use example of information processing devices 200 and 600 in a modification example of the embodiments of the present technology. In addition, the information processing device 200 is the same as the information processing device 200 illustrated in FIG. 1 and the like.

The information processing device 600 is attached to a cap, and includes an imaging unit 601, a display unit 602, and a sound output unit (not illustrated). In addition, the imaging unit 601, the display unit 602, and the sound output unit (not illustrated) respectively correspond to the units with the same names of the information processing device 200. Therefore, detailed description thereof will be omitted here.

In addition, FIG. 20 illustrates an example in which the information processing devices 200 and 600 are used together, but only the information processing device 600 may be used. Further, in a case where the information processing devices 200 and 600 are used together, sound information pieces 291 and 603 from the sound output units of the respective devices are preferably output in synchronization with each other. Furthermore, in a case where the information processing devices 200 and 600 are used together, either one of sounds from the sound output units of the respective devices may be output.

"Example of Attaching Information Processing Device of Advertisement Medium Side to Arm"

FIGS. 21A and 21B are diagrams illustrating an attachment example and a use example of an information processing device 610 in a modification example of the embodiments of the present technology. Specifically, FIG. 21A illustrates an attachment example of the information processing device 610, and FIG. 21B illustrates a use example of the information processing device 610.

The information processing device 610 is, for example, a wristwatch type smart phone attached to the arm 24 of the person, and includes an imaging unit 611, a display unit 612, and a sound output unit (not illustrated). In addition, the imaging unit 611, the display unit 612, and the sound output unit (not illustrated) respectively correspond to the units with the same names of the information processing device 200. Therefore, detailed description thereof will be omitted here.

Here, the information processing device 610 may control outputting of advertisement information, for example, depending on use by its owner. For example, in a case where the use of the information processing device 610 is started by its owner (for example, an operation of an electronic mail or viewing of a web site), outputting of advertisement information is stopped. On the other hand, in a case where the use of the information processing device 610 is finished by its owner, outputting of advertisement information may be controlled to be started.

Here, FIG. 21B illustrates a use example of the information processing device 610 in a train. As above, in a case where the information processing device 610 is present in a public transportation (for example, a bus, a ship, or an airplane) such as a train, sound outputting from the sound output unit is preferably stopped. For example, a control unit (not illustrated) of the information processing device 610 may determine whether or not the information processing device 610 is present in a travel path of a public transportation on the basis of position information acquired by a position information acquisition unit. In addition, the control unit (not illustrated) of the information processing device 610 may calculate a moving speed of the information processing device 610 on the basis of position information acquired by the position information acquisition unit, and may determine whether or not the information processing device 610 is present in a public transportation on the basis of the moving speed.

As illustrated in FIG. 21B, for example, the information processing device 610 is attached to the arm 24 holding the strap. In this case, for example, the information processing device 610 allows a passenger 25 near the person wearing the information processing device 610 to view advertisement information displayed on the display unit 612. For this reason, the person wearing the information processing device 610 can easily conduct an advertising activity, for example, even during commuting. Accordingly, the person wearing the information processing device 610 can earn money, for example, by an easy advertising activity even during commuting.

"Example of Attaching Information Processing Device of Advertisement Medium Side to Neck Strap and Bag"

Figure 22:
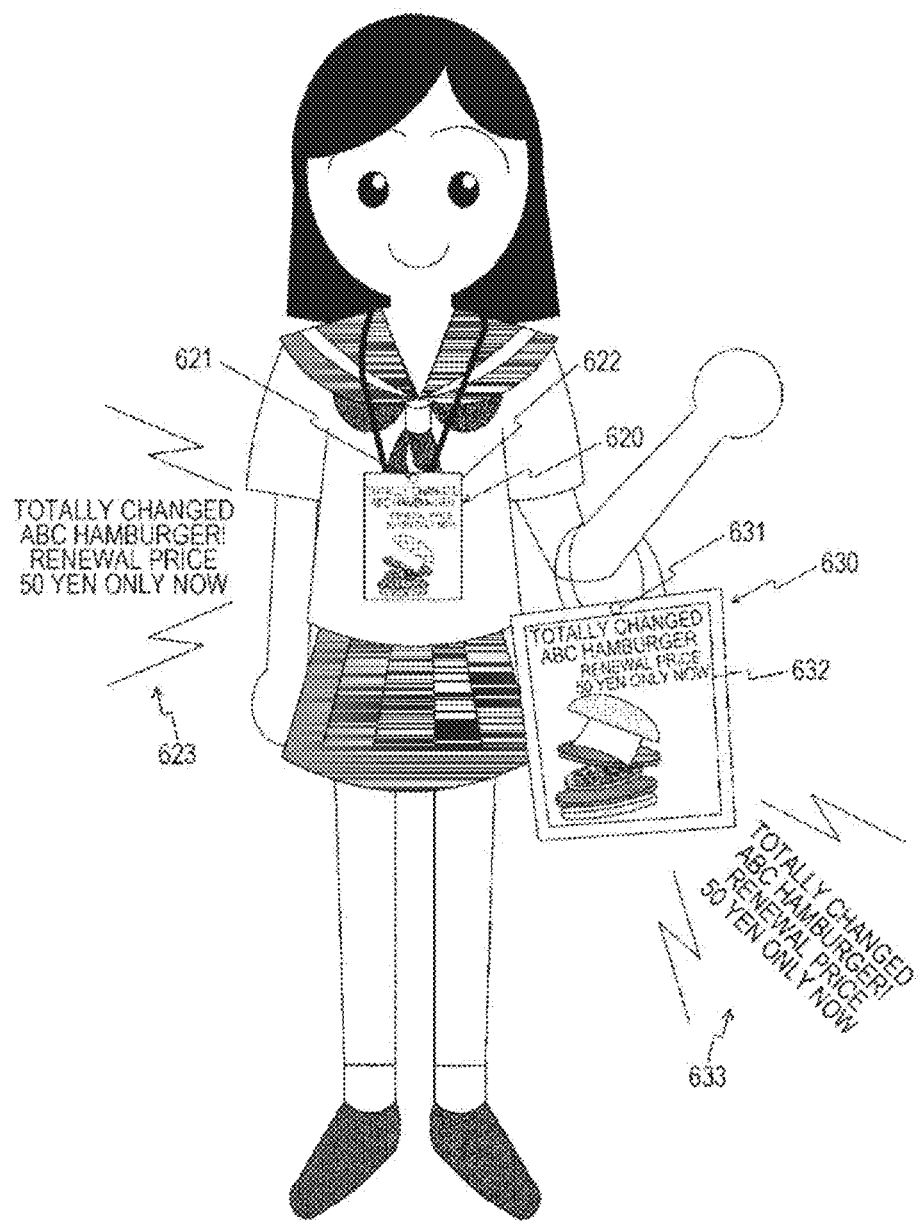
FIG. 22 is a diagram illustrating a use example of information processing devices in a modification example of the embodiments of the present technology.

FIG. 22 is a diagram illustrating a use example of information processing devices 620 and 630 in a modification example of the embodiments of the present technology.

The information processing device 620 is attached to a neck strap, and includes an imaging unit 621, a display unit 622, and a sound output unit (not illustrated). In addition, the information processing device 630 is attached to a bag (for example, a paper bag), and includes an imaging unit 631, a display unit 632, and a sound output unit (not illustrated). Further, the imaging units 621 and 631, the display units 622 and 632, and the sound output units (not illustrated) respectively correspond to the units with the same names of the information processing device 200. Therefore, detailed description thereof will be omitted here.

In addition, FIG. 22 illustrates an example in which the information processing devices 620 and 630 are used together, but either one thereof may be used. Further, in a case where the information processing devices 620 and 630 are used together, sound information pieces 623 and 633 from the sound output units of the respective devices are preferably output in synchronization with each other. Furthermore, in a case where the information processing devices 620 and 630 are used together, either one of sounds from the sound output units of the respective devices may be output.

"Example of Attaching Information Processing Device of Advertisement Medium Side to Shoes"

Figure 23:
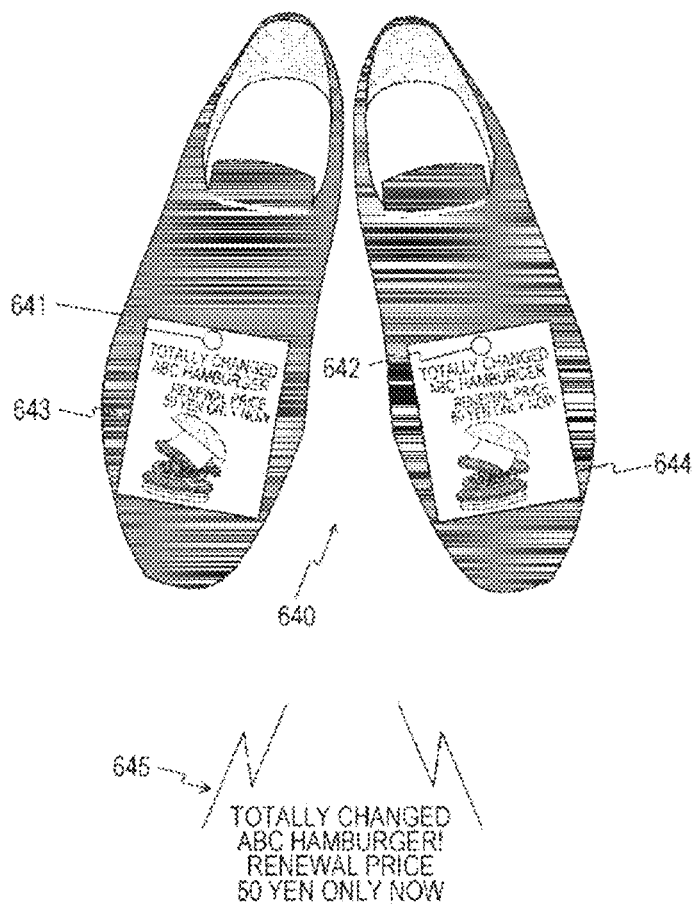
FIG. 23 is a diagram illustrating a use example of an information processing device in a modification example of the embodiments of the present technology.

FIG. 23 is a diagram illustrating a use example of an information processing device 640 in a modification example of the embodiments of the present technology.

The information processing device 640 is attached to shoes, and includes imaging units 641 and 642, display units 643 and 644, and sound output units (not illustrated). In addition, the imaging units 641 and 642, the display units 643 and 644, and the sound output units (not illustrated) respectively correspond to the units with the same names of the information processing device 200. Therefore, detailed description thereof will be omitted here.

In addition, FIG. 23 illustrates an example in which the imaging units and the display units are provided in each of a pair of shoes, but the imaging units and the display units may be provided in either one thereof. Further, for example, the display units may be provided in each of a pair of shoes, and the imaging units and the sound output units (not illustrated) may be provided in either one thereof.

Further. FIG. 23 illustrates an example in which the information processing device 640 is attached to the front parts of the shoes, but the information processing device 640 may be attached to other parts (for example, side parts of the shoes, or rear parts of the shoes).

"Example of Attaching Information Processing Device of Advertisement Medium Side to Bicycle"

Figure 24:
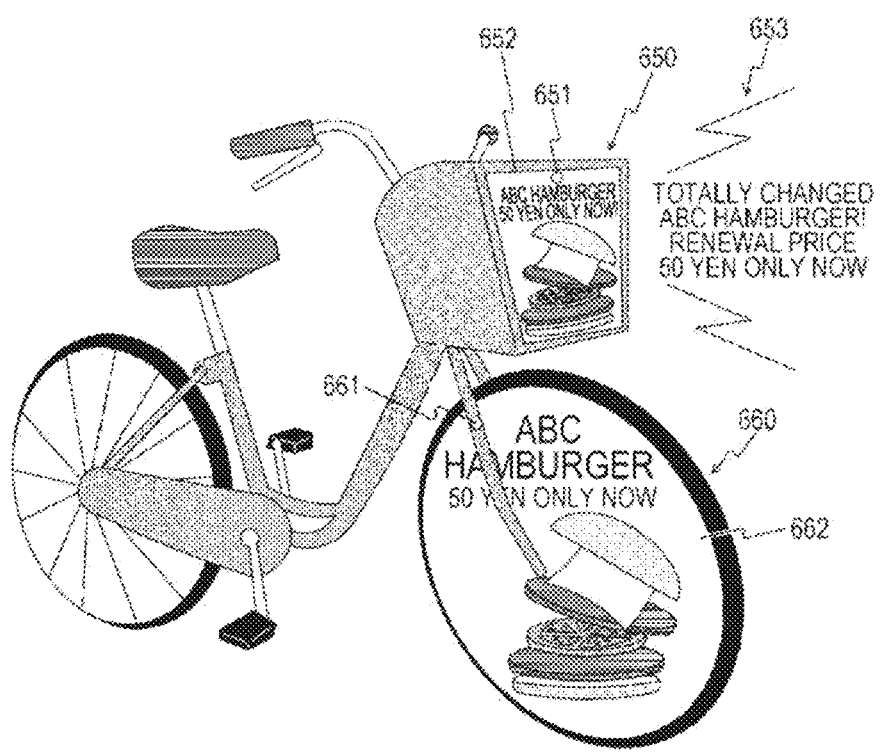
FIG. 24 is a diagram illustrating a use example of information processing devices in a modification example of the embodiments of the present technology.

FIG. 24 is a diagram illustrating a use example of information processing devices 650 and 660 in a modification example of the embodiments of the present technology.

The information processing device 650 is attached to a front basket of a bicycle, and includes an imaging unit 651, a display unit 652, and a sound output unit (not illustrated). In addition, the information processing device 660 is attached to a wheel part (for example, left and right) on the front side of the bicycle, and includes an imaging unit 661, a display unit 662, and a sound output unit (not illustrated).

Further, the imaging units 651 and 661, the display units 652 and 662, and the sound output units (not illustrated) respectively correspond to the units with the same names of the information processing device 200. Therefore, detailed description thereof will be omitted here.

In addition, FIG. 24 illustrates an example in which two information processing devices 650 and 660 are attached to a single bicycle, but a single information processing device may be attached thereto.

Further, FIG. 24 illustrates an example in which the information processing devices 650 and 660 are attached to the front basket of the bicycle and the wheel part on the front side, but the information processing devices may be attached to other parts (for example, a wheel part on the rear side, and a carrier part).

"Example of Attaching Information Processing Device of Advertisement Medium Side to Car"

Figure 25:
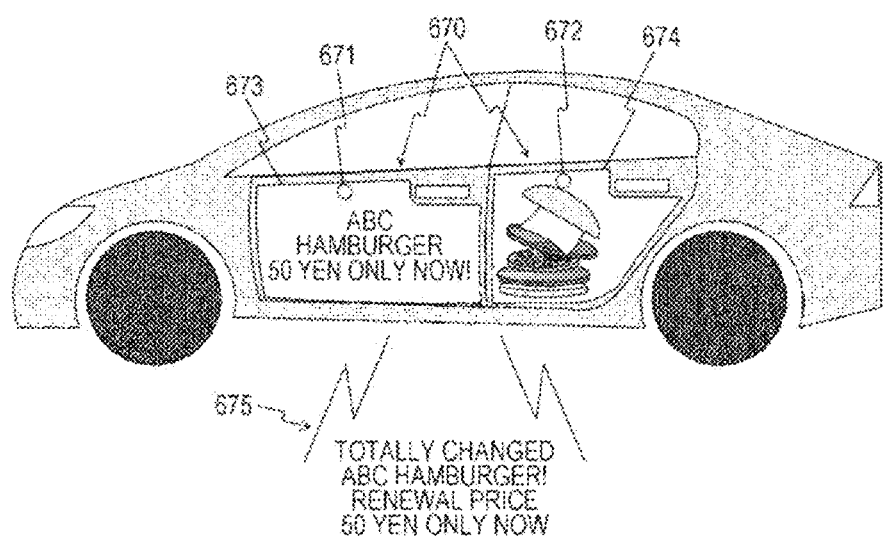
FIG. 25 is a diagram illustrating a use example of an information processing device in a modification example of the embodiments of the present technology.

FIG. 25 is a diagram illustrating a use example of an information processing device 670 in a modification example of the embodiments of the present technology.

The information processing device 670 is attached to side surfaces (for example, left and right surfaces) of a car, and includes imaging units 671 and 672, display units 673 and 674, and sound output units (not illustrated). In addition, FIG. 25 illustrates only the left side surface of the car, but the information processing device 670 is assumed to be also attached to the right side surface of the car. Further, the imaging units 671 and 672, the display units 673 and 674, and the sound output units (not illustrated) respectively correspond to the units with the same names of the information processing device 200. Therefore, detailed description thereof will be omitted here.

In addition, FIG. 25 illustrates an example in which the imaging units 671 and 672 and the display units 673 and 674 are attached to two doors of the side surface of a single car, but the imaging units and the display units may be attached to a single door.

Further, FIG. 25 illustrates an example in which the information processing device 670 is attached to the side surface part of the car, but the information processing device may be attached to other parts (for example, a front side (for example, a bonnet), and a rear side).

Here, since a bicycle or a car travels at a high speed, it is expected that it is difficult to appropriately perform a visual line detection process using an image which is generated by an imaging unit during traveling thereof. For this reason, for example, visual line detection may not be performed during traveling thereof, and the visual line detection may be performed only at the time of stopping thereof.

As described above, the output unit (for example, the display unit or the sound output unit) of the information processing device of the advertisement medium side is attached to at least a part of the person, the clothes of the person, the bag of the person, the shoes of the person, the body of the person, the vehicles (for example, the bicycle and the car) owned by the person.

As above, according to the embodiments of the present technology, it is possible to realize an advertisement business model using a wearable next-generation mobile device. For example, a person who wears the wearable next-generation mobile device serves as an advertisement medium, and the person travels (for example, travels on a street), thereby easily and effectively developing an advertisement. In addition, the person can acquire compensation such as money, goods, or a service, from an advertiser.

In addition, the manager of the information processing device 100 which provides an advertisement performs management of a person serving as an advertisement medium, matching between an advertiser and a person serving as an advertisement medium, determination of an advertisement value (compensation), and the like, thereby operating an advertisement business platform. In other words, the information processing device 100 sets an output condition which is necessary for a person serving as an advertisement medium to independently develop an advertisement, and filters an advertisement which can be output for each person serving as an advertisement medium by using profile information. Accordingly, it is possible to provide a business model in which the person serving as an advertisement medium can independently conduct an advertising activity and acquire compensation.

Specifically, the information processing device 100 manages persons serving as an advertisement medium by using profile information, and performs matching between a person serving as an advertisement medium and an advertiser by using this profile information. Accordingly, it is possible to select an appropriate person (a person serving as an advertisement medium) meeting a demand of an advertiser. The person (a person serving as an advertisement medium) selected in this way is notified of information indicating that the person is selected and an advertisement which is an output target, so as to select advertisement information. Therefore, the selected person (a person serving as an advertisement medium) can independently select advertisement content. In addition, a person (a person serving as an advertisement medium), who is considered to be effective in advertising by an advertiser, independently selects an advertisement, and thus it is possible to maximize an advertisement effect. The person serving as an advertisement medium develops the advertisement selected in this way, which can lead to improvement of the advertisement (a product related to the advertisement).

In addition, the information processing device 100 can measure an advertisement effect through a device (an information processing device of an advertisement medium side) of a person serving as an advertisement medium. Further, as a result of measuring the effect, effect measurement information can be generated in consideration of evaluation or the like by other persons so as to be transmitted to an advertiser.

In addition, a manager of the information processing device 100 defines compensation for an advertising activity, and presents an option of compensation to a person serving as an advertisement medium. In this case, not only money but also compensation (compensation for an activity of the person serving as an advertisement medium) such as goods or a service may be presented. Further, it is possible to increase a desire for an advertising activity by providing compensation for the advertising activity in this way. Accordingly, a person serving as an advertisement medium can be motivated before an advertising activity, and appropriate compensation can be paid to the person who has conducted the advertising activity in accordance with content of the advertising activity after the advertising activity.

In addition, in the embodiments of the present technology, the integrally formed information processing device (for example, the information processing device 100 or 200) has been described as an example. However, the embodiments of the present technology are applicable to an information processing system in which each unit included in such an information processing device is constituted by a plurality of devices. For example, instead of the information processing device 100, an information processing system (for example, a cloud computing system) on a network may be used.

Further, the embodiments of the present technology are applicable to an information processing system in which a display device, a sound output device, and a wireless communication device are connected to each other by using wireless communication (for example, a wireless LAN) as an information processing device of an advertisement medium side.

In addition, the above-described embodiments are only an example for embodying the present technology, and the matters in the embodiments respectively have correspondence relationships with the matters which specify the present technology in the claims. Similarly, the matters which specify the present technology in the claims respectively have correspondence relationships with the matters with the same names in the embodiments of the present technology. However, the present technology is not limited to the embodiments, and may be embodied by performing various modifications on the embodiments in the scope without departing from the spirit thereof.

Further, the process procedures described in the above-described embodiments may be understood as a method including a series of these procedures, and may be understood as a program causing a computer to execute a series of these procedures or a recording medium recording the program thereon. As the recording medium, for example, a compact disc (CD), a minidisc (MD), a digital versatile disc (DVD), a memory card, a Blu-ray (registered trademark) disc, and the like may be used.

In addition, the present technology may have the following configurations.

(1) An information processing system including circuitry configured to acquire feedback information from a first user having viewed an advertising activity of a second user, the advertising activity including displaying advertising information on an information processing apparatus possessed by the second user; and update profile information for determining an effectiveness of the advertising activity based on the received feedback information.

(2) The information processing system (1), wherein the profile information includes identification information corresponding to at least one of the second user and the information processing apparatus.

(3) The information processing system of any of (1) to (2), wherein the profile information includes personal attribute information corresponding to the second user, the personal attribute information indicating at least one of a gender, age and occupation of the second user.

(4) The information processing system of any of (1) to (3), wherein the profile information includes behavior information corresponding to the advertising activity, the behavior information indicating at least one of an location and an activity corresponding to the second user while performing the advertising activity.

(5) The information processing system of any of (1) to (4), wherein the profile information includes appearance information corresponding to the second user, the appearance information indicating at least one of a hair style, a fashion style, a celebrity resemblance and body type corresponding to the second user.

(6) The information processing system of any of (1) to (5), wherein the profile information includes grading information as the profile information for determining the effectiveness of the advertising activity.

(7) The information processing system of any of (1) to (6), wherein the circuitry is configured to store advertising activity information of each of a plurality of advertising activities including the advertising activity of the second user.

(8) The information processing system of (7), wherein the advertising activity information includes personal identification information corresponding to a user that performs the advertising activity.

(9) The information processing system of any of (7) to (8), wherein the advertising activity information includes advertisement identification information corresponding to the advertising activity.

(10) The information processing system of any of (7) to (9), wherein the advertising activity information includes effect measurement information indicating at least one of a visual effect, movement distance, location and duration corresponding to the advertising activity.

(11) The information processing system of any of (7) to (10), wherein the advertising activity information includes evaluation information received from a user viewing the advertising activity.

(12) The information processing system of any of (7) to (11), wherein the advertising activity information includes grading information indicating an effectiveness of the advertising activity.

(13) The information processing system of any of (1) to (12), wherein the circuitry is configured to generate the profile information for determining the effectiveness of the advertising activity based on effect measurement information and the feedback information acquired from the second user.

(14) The information processing system of (13), wherein the effect measurement information includes information indicating at least one of a visual effect, movement distance, location and duration corresponding to the advertising activity.

(15) The information processing system of any of (13) to (14), wherein the feedback information acquired from the first user includes at least one of information evaluating the advertising information displayed by the information processing apparatus and information evaluating the second user.

(16) The information processing system of any of (1) to (15), wherein the stored profile information includes profile information corresponding to a plurality of users including the second user, and the profile information includes grading information indicating an effectiveness of an advertising activity performed by each of the plurality of users.

(17) The information processing system of (16), wherein the circuitry is configured to rank the plurality of users based on the grading information.

(18) The information processing system of (17), wherein the circuitry is configured to determine a reward to be given to at least one of the plurality of users based on the grading information.

(19) The information processing system of any of (16) to (18), wherein the circuitry is configured to select a user from the plurality of users to perform an advertising activity based on the grading information indicating the effectiveness of the advertising activity performed by each of the plurality of users.

(20) A method performed by an information processing system, the method including: acquiring, by circuitry of the information processing system, feedback information from a first user having viewed an advertising activity of a second user, the advertising activity including displaying advertising information on an information processing apparatus possessed by the second user; and updating, by the circuitry, profile information for determining an effectiveness of the advertising activity based on the received feedback information.

(21) A non-transitory computer-readable medium including computer program instructions, which when executed by an information processing system, cause the system to: acquire feedback information from a first user having viewed an advertising activity of a second user, the advertising activity including displaying advertising information on an information processing apparatus possessed by the second user; and update profile information for determining an effectiveness of the advertising activity based on the received feedback information.

(22) An information processing device including a profile information management unit that manages profile information regarding a plurality of persons; an extraction unit that extracts a person satisfying an output condition from the plurality of persons on the basis of the output condition regarding advertisement information which is an output target and the profile information; and a control unit that performs control for outputting the advertisement information from an output device of the extracted person.

(23) The information processing device according to the above (22), wherein the profile information includes attribute information regarding an attribute of a person which is a management target, behavior information regarding a behavior of the person, and appearance information regarding an appearance of the person, and wherein the extraction unit extracts information satisfying the output condition from the respective information pieces included in the profile information, and extracts a person corresponding to the extracted information.

(24) The information processing device according to the above (22) or (23), wherein the control unit transmits the advertisement information to the output device, thereby outputting the advertisement information from the output device, when the control unit transmits advertisement selection information for selecting outputting of the advertisement information to the output device, and then receives selection information indicating that the outputting of the advertisement information is selected from the output device.

(25) The information processing device according to any one of the above (22) to (24), further including an advertising activity information management unit that manages effect measurement information based on a measurement result of an effect regarding outputting of the advertisement information from the output device.

(26) The information processing device according to any one of the above (22) to (25), further including an advertising activity information management unit that manages evaluation information which indicates evaluation regarding outputting of the advertisement information, the evaluation being performed by a person who acquires the advertisement information output from the output device.

(27) The information processing device according to any one of the above (22) to (26), wherein the control unit generates grading information regarding the extracted person on the basis of effect measurement information which is based on a measurement result of an effect regarding outputting of the advertisement information from the output device, and evaluation information which indicates evaluation regarding the outputting of the advertisement information, the evaluation being performed by a person who acquires the advertisement information output from the output device.

(28) The information processing device according to the above (27), wherein the control unit determines a reward given to the extracted person for the outputting of the advertisement information from the output device on the basis of the grading information.

(29) The information processing device according to any one of the above (22) to (28), wherein the control unit transmits related information to another information processing device when an acquisition request of the related information regarding the advertisement information is received from another information processing device during outputting of the advertisement information from the output device.

(30) The information processing device according to any one of the above (22) to (29), wherein the control unit stores the advertisement information in an advertisement information providing device which transmits and receives information to and from other devices by using short-range wireless communication, and transmits the advertisement information from the advertisement information providing device to the output device by using the short-range wireless communication, thereby outputting the advertisement information from the output device.

(31) A communication system including an information processing device having a profile information management unit that manages profile information regarding a plurality of persons; an extraction unit that extracts a person satisfying an output condition from the plurality of persons on the basis of the output condition regarding advertisement information which is an output target and the profile information; and a control unit that performs control for transmitting the advertisement information to an output device of the extracted person, thereby outputting the advertisement information from the output device, and an output device having an output unit that outputs the advertisement information.

(32) An information processing method including extracting a person satisfying an output condition from a plurality of persons on the basis of the output condition regarding advertisement information which is an output target and profile information regarding the plurality of persons; and performing control for outputting the advertisement information from an output device of the extracted person.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Communication system
11 Network
12 Base station
13 Advertiser side information processing device
14, 15, 21, 31, 100, 200, 201, 600, 610, 620, 630, 640, 650, 660, 670 Information processing device
110 Profile information storage unit
120 Advertising activity information storage unit
130 Advertisement information storage unit
140 Communication unit
150, 260 Operation reception unit
160 Extraction unit
170, 270 Control unit
180, 280, 281, 602, 612, 622, 632, 643, 652, 662, 673 Display unit
210 Wireless communication unit
211 Antenna 220 Advertisement information storage unit
230, 231, 601, 611, 621, 631, 641, 651, 661, 671 Imaging unit
240 Position information acquisition unit
250 Posture detection unit
300 Advertisement information providing device
310, 320 Short-range wireless communication unit

The invention claimed is:

1. An information processing system comprising:
a first device including processing circuitry configured to
store profile information of an operator of a second device,
transmit advertisement selection information to the second device,
transmit advertisement information to the second device corresponding to the advertisement selection information,
acquire effect measurement information from the second device when an advertising activity of the second device has been viewed, the advertising activity including displaying the advertising information on the second device, wherein the second device includes processing circuitry configured to
detect a change in a posture of the second device,
detect a visual line of a person looking at the advertisement information displayed on the second device,
generate the effect measurement information indicating an effect of the advertisement information displayed on the second device based on the visual line of the person looking at the advertisement and an activity state of the second device, the activity state of the second device including a movement distance, a position, and an amount of time the advertisement information is displayed on the second device, and
display an advertisement evaluation screen,
acquire evaluation information from the second device indicating an evaluation, by the person looking at the advertisement, of the advertisement information displayed on the second device, the evaluation information being received from the advertisement evaluation screen,
generate grading information of the second device based on the effect measurement information and the evaluation information, and
update the stored profile information of the operator of the second device to include the generated grading information.

2. The information processing system of claim 1, wherein the profile information includes identification information corresponding to at least one of the first device and the second device.

3. The information processing system of claim 1, wherein the profile information includes personal attribute information corresponding to a user of the second device, the personal attribute information indicating at least one of a gender, age and occupation of the user of the second device.

4. The information processing system of claim 1, wherein the profile information includes behavior information corresponding to the advertising activity, the behavior information indicating at least one of a location and an activity corresponding to the user of the second device while performing the advertising activity.

5. The information processing system of claim 1, wherein the profile information includes appearance information corresponding to the user of the second device, the appearance information indicating at least one of a hair style, a fashion style, a celebrity resemblance and body type corresponding to the user of the second device.

6. The information processing system of claim 1, wherein the profile information includes grading information as the profile information for determining the effectiveness of the advertising activity.

7. The information processing system of claim 1, wherein the processing circuitry is configured to store advertising activity information of each of a plurality of advertising activities including the advertising activity of the user of the second device.

8. The information processing system of claim 7, wherein the advertising activity information includes personal identification information corresponding to a user that performs the advertising activity.

9. The information processing system of claim 7, wherein the advertising activity information includes advertisement identification information corresponding to the advertising activity.

10. The information processing system of claim 7, wherein the advertising activity information includes effect measurement information indicating at least one of a visual effect, movement distance, location and duration corresponding to the advertising activity.

11. The information processing system of claim 7, wherein the advertising activity information includes grading information indicating an effectiveness of the advertising activity.

12. The information processing system of claim 1, wherein the processing circuitry is configured to generate the profile information for determining the effectiveness of the advertising activity based on effect measurement information and the effect measurement information and evaluation information acquired from the user of the second device.

13. The information processing system of claim 12, wherein the effect measurement information includes information indicating at least one of a visual effect, movement distance, location and duration corresponding to the advertising activity.

14. The information processing system of claim 12, wherein the evaluation information acquired from the second device includes at least one of information evaluating the advertising information displayed by the information processing apparatus and information evaluating the user of the second device.

15. The information processing system of claim 1, wherein the stored profile information includes profile information corresponding to a plurality of users including the user of the second device, and
the profile information includes grading information indicating an effectiveness of an advertising activity performed by each of the plurality of users.

16. The information processing system of claim 15, wherein the processing circuitry is configured to rank the plurality of users based on the grading information.

17. The information processing system of claim 16, wherein the processing circuitry is configured to determine a reward to be given to at least one of the plurality of users based on the grading information.

18. The information processing system of claim 15, wherein the processing circuitry is configured to select a user from the plurality of users to perform an advertising activity based on the grading information indicating the effectiveness of the advertising activity performed by each of the plurality of users.

19. A method performed by an information processing system, the method comprising:
- storing, on the information processing system, profile information of an operator of a second device;
- transmitting advertisement selection information to the second device;
- transmitting advertisement information to the second device corresponding to the advertisement selection information;
- acquiring, by circuitry of the information processing system, effect measurement information from the second device when an advertising activity of the second device has been viewed, the advertising activity including displaying the advertising information on the second device;
- detecting, by processing circuitry in the second device, a change in a posture of the second device;
- detecting a visual line of a person looking at the advertisement information displayed on the second device;
- generating the effect measurement information indicating an effect of the advertisement information displayed on the second device based on the visual line of the person looking at the advertisement and an activity state of the second device, the activity state of the second device including a movement distance, a position, and an amount of time the advertisement information is displayed on the second device;
- displaying an advertisement evaluation screen on the second device;
- acquiring evaluation information from the second device indicating an evaluation, by the person looking at the advertisement, of the advertisement information displayed on the second device, the evaluation information being received from the advertisement evaluation screen;
- generating grading information of the second device based on the effect measurement information and the evaluation information; and
- updating, by the circuitry, the stored profile information of the operator of the second device to include the generated grading information.

20. A non-transitory computer-readable medium including computer program instructions, which when executed by an information processing system, cause the system to:
- store, on the information processing system, profile information of an operator of a second device;
- transmit advertisement selection information to the second device;
- transmit advertisement information to the second device corresponding to the advertisement selection information;
- acquire effect measurement information from the second device when an advertising activity of the second device has been viewed, the advertising activity including displaying the advertising information on the second device, wherein the second device includes processing circuitry configured to
  - detect a change in a posture of the second device,
  - detect a visual line of a person looking at the advertisement information displayed on the second device,
  - generate the effect measurement information indicating an effect of the advertisement information displayed on the second device based on the visual line of the person looking at the advertisement and an activity state of the second device, the activity state of the second device including a movement distance, a position, and an amount of time the advertisement information is displayed on the second device, and
  - display an advertisement evaluation screen,
- acquire evaluation information from the second device indicating an evaluation, by the person looking at the advertisement, of the advertisement information displayed on the second device, the evaluation information being received from the advertisement evaluation screen;
- generate grading information of the second device based on the effect measurement information and the evaluation information; and
- update the stored profile information of the operator of the second device to include the generated grading information.

\* \* \* \* \*